US012493444B2

(12) United States Patent
Binal et al.

(10) Patent No.: US 12,493,444 B2
(45) Date of Patent: Dec. 9, 2025

(54) SYSTEM AND METHOD FOR GENERATING A VISUAL INDICATOR TO IDENTIFY A LOCATION OF A CEILING MOUNTED LOUDSPEAKER

(71) Applicant: Crestron Electronics, Inc., Rockleigh, NJ (US)

(72) Inventors: Ekin Binal, Brooklyn, NY (US); Neil Hildick-Smith, New York, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 17/878,621

(22) Filed: Aug. 1, 2022

(65) Prior Publication Data
US 2024/0036806 A1 Feb. 1, 2024

(51) Int. Cl.
G06F 3/16 (2006.01)
G06F 13/38 (2006.01)
H04R 3/00 (2006.01)
H04R 29/00 (2006.01)

(52) U.S. Cl.
CPC ............ G06F 3/162 (2013.01); G06F 13/385 (2013.01); H04R 3/00 (2013.01); H04R 2420/05 (2013.01); H04R 2420/07 (2013.01)

(58) Field of Classification Search
CPC .................................. H04R 3/04; H04R 3/005
See application file for complete search history.

(56) References Cited

U.S. PATENT DOCUMENTS

2007/0291952 A1* 12/2007 Spielbauer ............. H04R 29/00
381/26
2010/0316237 A1* 12/2010 Elberbaum .......... H04M 11/025
381/300
2014/0086416 A1* 3/2014 Sen ........................ G10L 19/008
381/23

(Continued)

Primary Examiner — Getente A Yimer
(74) Attorney, Agent, or Firm — Mark W. Hrozenchik

(57) ABSTRACT

A system and method are described herein for generating a visual indicator in a loudspeaker to identify a location of the loudspeaker in a room, the system and method comprising: at least two loudspeaker assemblies, each of which are adapted to receive digitally encoded audio signals and other digital signals, each of the at least two loudspeaker assemblies having a unique digital address and each comprising at least one loudspeaker; at least one processor communicatively coupled to each of the at least two loudspeaker assemblies; an input device communicatively coupled to the at least one processor; and a memory operatively connected with the at least one processor, wherein the memory stores computer-executable instructions that, when executed by the at least one processor, cause the at least one processor to execute a method that comprises: receiving an input from the input device at the at least one processor, the input indicating which one of the at least two loudspeaker assemblies to identify a location thereof; generating a message to be transmitted to the indicated loudspeaker assembly, wherein the message contains commands and data to generate a visual indicator in the indicated loudspeaker assembly; transmitting the message to the indicated loudspeaker assembly; and generating the visual indicator according to the message at the indicated loudspeaker assembly.

16 Claims, 13 Drawing Sheets

(56) References Cited

U.S. PATENT DOCUMENTS

| | | | |
|---|---|---|---|
| 2015/0269929 A1* | 9/2015 | Emery | G10L 15/10 704/254 |
| 2016/0059775 A1* | 3/2016 | Gorse | G01C 21/3661 701/468 |
| 2017/0086003 A1* | 3/2017 | Rabinowitz | H04R 3/04 |
| 2019/0124462 A1* | 4/2019 | Lindahl | H04R 3/005 |

* cited by examiner

SYSTEM AND METHOD FOR GENERATING A VISUAL INDICATOR TO IDENTIFY A LOCATION OF A CEILING MOUNTED LOUDSPEAKER

CROSS REFERENCE TO RELATED APPLICATIONS

Related subject matter is disclosed in U.S. Non-provisional patent applications Ser. Nos. 17/878,163, 17/878,311, 17/878,353, 17/878,198, 17/878,477, 17/878,691, each of which were filed Aug. 1, 2022, and Ser. No. 19/183,042, filed on Apr. 18, 2025, and Ser. No. 19/006,863, filed on Dec. 31, 2024, the entire contents of all of which are expressly incorporated herein by reference.

BACKGROUND OF THE INVENTION

Technical Field

The embodiments described herein relate generally to loudspeakers, and more specifically to systems, methods, and modes for generating a visual indicator to identify a location of a ceiling mounted loudspeaker in an audio distribution system.

Background Art

The rise in hybrid work has placed increasing demands on the level of reliability expected of business audio systems. Simultaneously, the audio market has become ever-more sophisticated. While this increasing sophistication offers new features for customers, the modern audio distribution network is more challenging than ever to successfully install.

Audio systems can include audio signal sources and receivers, amplifiers, digital signal processors, internet or other network interfaces, cabling, and loudspeakers. While many enterprise systems (audio, environmental, lighting, shading, and the like) require careful installation, audio systems present unique challenges. These challenges include the distributed nature of the system, and the potential for latent, hard-to-troubleshoot issues, among others.

There are numerous issues that can be encountered when installing traditional loudspeakers. The standard architecture currently employed by the industry requires a field installer to run speaker wire between amplifier outputs and speakers. This requires a wire stripper, a specific type of wire (i.e., speaker wire) and an installer with some degree of specialized familiarity with speaker installations. In addition to the added work and complexity, the inherent nature of speaker wire installation opens the possibility for human error. If the installer were to accidentally flip the polarity of the speaker wire, the result would be a loudspeaker 180° out-of-phase from the source. While potentially immediately evident in a multi-speaker system, this mistake would likely go undetected in a single-speaker setup. In such a scenario, the latent issue might not emerge until a later point in time when the space is upgraded to include additional speakers. The destructive interference between the two out-of-phase audio sources result would result in degraded performance. That the original error was made months or potentially years prior, likely by another installer, would make it difficult and time-intensive to troubleshoot.

Still more challenges arise when one considers loudspeakers that include an integrated amplifier, hereafter referred to as active loudspeakers. Such devices can receive power and audio streams through standard interfaces (e.g., RJ45); some embodiments of Active Loudspeakers may additionally transmit speaker-level audio on similarly common-place connectors. Given the large amount of equipment located in a modern office, it is entirely possible for the installer to accidentally connect an Active Loudspeakers to a piece of unrelated equipment (e.g., a projector). If unmitigated, a miswiring of this nature can destroy one or both pieces of equipment. Further challenges include the sheer number of audio zones found in a modern office building; as the number of zones increase, it becomes increasingly important for the installer to easily correlate digital IDs with physical speakers. A final challenge includes maximizing system audio volume per the power constraints associated with any given installation; power steering and manipulation of the audio stream must be implemented to get the most volume out of a given power scheme (e.g., IEEE802.3af versus IEEE802.3at).

Accordingly, a need has arisen for systems, methods, and modes for generating a visual indicator to identify a location of a ceiling mounted loudspeaker in an audio distribution system.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for generating a visual indicator to identify a location of a ceiling mounted loudspeaker in an audio distribution system that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a system for generating a visual indicator in a loudspeaker to identify a location of the loudspeaker in a room is provided, comprising: at least two loudspeaker assemblies, each of which are adapted to receive digitally encoded audio signals and other digital signals, each of the at least two loudspeaker assemblies having a unique digital address and each comprising at least one loudspeaker; at least one processor communicatively coupled to each of the at least two loudspeaker assemblies; an input device communicatively coupled to the at least one processor; and a memory operatively connected with the at least one processor, wherein the memory stores computer-executable instructions that, when executed by the at least one processor, cause the at least one processor to execute a method that comprises: receiving an input from the input device at the at least one processor, the input indicating which one of the at least two loudspeaker assemblies to identify a location thereof; generating a message to be transmitted to the indicated loudspeaker assembly, wherein the message contains commands and data to generate a visual indicator in the indicated loudspeaker assembly; transmitting the message to the indicated loudspeaker assembly; and generating the visual indicator according to the message at the indicated loudspeaker assembly.

According to the first aspect of the embodiments, the at least two loudspeaker assemblies comprises: a first and second loudspeaker assembly communicatively coupled in parallel to the at least one processor.

According to the first aspect of the embodiments, the first and second loudspeaker assemblies are active loudspeaker assemblies, each of which contain at least one amplifier.

According to the first aspect of the embodiments, the at least two loudspeaker assemblies comprises: a first and second loudspeaker assembly communicatively coupled in series to the at least one processor.

According to the first aspect of the embodiments, the first loudspeaker assembly is an active loudspeaker assembly and comprises at least one amplifier for amplifying audio signals prior to broadcast by the at least one loudspeaker, and wherein the second loudspeaker assembly is a passive loudspeaker assembly that receives amplified audio from the active loudspeaker assembly.

According to the first aspect of the embodiments, each of the at least one loudspeakers in the first and second loudspeaker assemblies are balanced mode radiator loudspeakers.

According to the first aspect of the embodiments, the method further comprises: generating a message to be transmitted to the indicated loudspeaker assembly, wherein the message contains commands and data to generate an audio indicator in the indicated loudspeaker assembly; transmitting the message to the indicated loudspeaker assembly; and playing the audio indicator according to the message at the indicated loudspeaker assembly.

According to a second aspect of the embodiments, a method for generating a visual indicator in a loudspeaker to identify a location of the loudspeaker in a room is provided, wherein the room contains at least two loudspeaker assemblies, the method comprising: receiving an input from an input device at at least one processor, the at least one processor communicatively coupled to each of the at least two loudspeaker assemblies, and a memory operatively connected with the at least one processor, wherein the memory stores computer-executable instructions that, when executed by the at least one processor, cause the at least one processor to execute the method, and wherein the input indicates which one of at least two loudspeaker assemblies to identify a location thereof; generating a message to be transmitted to the indicated loudspeaker assembly, wherein the message contains commands and data to generate a visual indicator in the indicated loudspeaker assembly; transmitting the message to the indicated loudspeaker assembly; and generating the visual indicator according to the message at the indicated loudspeaker assembly.

According to the second aspect of the embodiments, the at least two loudspeaker assemblies comprises: a first and second loudspeaker assembly are communicatively coupled in parallel to the at least one processor.

According to the second aspect of the embodiments, the first and second loudspeaker assemblies are active loudspeaker assemblies, each of which contain at least one amplifier.

According to the second aspect of the embodiments, the at least two loudspeaker assemblies comprise: a first and second loudspeaker assembly communicatively coupled in series to the at least one processor.

According to the second aspect of the embodiments, the first loudspeaker assembly is an active loudspeaker assembly and comprises at least one amplifier for amplifying audio signals prior to broadcast by the at least one loudspeaker, and wherein the second loudspeaker assembly is a passive loudspeaker assembly that receives amplified audio from the active loudspeaker assembly.

According to the second aspect of the embodiments, each of the at least one loudspeakers in the first and second loudspeaker assemblies are balanced mode radiator loudspeakers.

According to the second aspect of the embodiments, the method further comprises: generating a message to be transmitted to the indicated loudspeaker assembly, wherein the message contains commands and data to generate an audio indicator in the indicated loudspeaker assembly; transmitting the message to the indicated loudspeaker assembly; and playing the audio indicator according to the message at the indicated loudspeaker assembly.

According to a third aspect of the embodiments, an audio distribution system (ADS) is provided, comprising: at least two loudspeaker assemblies, each of which are adapted to receive digitally encoded audio signals and other digital signals, each of the at least two loudspeaker assemblies having a unique digital address and each comprising at least one loudspeaker; and an audio distribution system (ADS) controller, the ADS controller comprising: at least one processor communicatively coupled to each of the at least two loudspeaker assemblies; an input device communicatively coupled to the at least one processor; and a memory operatively connected with the at least one processor, wherein the memory stores computer-executable instructions that, when executed by the at least one processor, cause the at least one processor to execute a method that comprises: receiving an input from the input device at the at least one processor, the input indicating which one of the at least two loudspeaker assemblies to identify a location thereof; generating a message to be transmitted to the indicated loudspeaker assembly, wherein the message contains commands and data to generate a visual indicator in the indicated loudspeaker assembly; transmitting the message to the indicated loudspeaker assembly; and generating the visual indicator according to the message at the indicated loudspeaker assembly.

According to the third aspect of the embodiments, the system further comprises: an external audio source, communicatively coupled to the ADS controller, the external audio source adapted to transmit audio signals to the ADS controller to be broadcast through at least one of the at least two loudspeaker assemblies; and a network server communicatively coupled to the ADS controller and a network, the network server adapted to receive messages through the network, the messages comprising audio information to be broadcast through at least one of the at least two loudspeaker assemblies.

According to the third aspect of the embodiments, the at least two loudspeaker assemblies comprises: a first and second loudspeaker assembly are communicatively coupled in parallel to the at least one processor.

According to the third aspect of the embodiments, the first and second loudspeaker assemblies are active loudspeaker assemblies, each of which contain at least one amplifier.

According to the third aspect of the embodiments, the at least two loudspeaker assemblies comprises: a first and second loudspeaker assembly are communicatively coupled in series to the at least one processor.

According to the third aspect of the embodiments, the first loudspeaker assembly is an active loudspeaker assembly and comprises at least one amplifier for amplifying audio signals prior to broadcast by the at least one loudspeaker, and wherein the second loudspeaker assembly is a passive loudspeaker assembly that receives amplified audio from the active loudspeaker assembly.

According to the third aspect of the embodiments, each of the at least one loudspeakers in the first and second loudspeaker assemblies are balanced mode radiator loudspeakers.

According to the third aspect of the embodiments, the method further comprises: generating a message to be transmitted to the indicated loudspeaker assembly, wherein the message contains commands and data to generate an audio indicator in the indicated loudspeaker assembly; transmitting the message to the indicated loudspeaker assembly; and playing the audio indicator according to the message at the indicated loudspeaker assembly.

According to a fourth aspect of the embodiments, an audio distribution system (ADS) is provided, comprising: at least two loudspeaker assemblies, each of which are adapted to receive digitally encoded audio signals and other digital signals, each of the at least two loudspeaker assemblies having a unique digital address and each comprising at least one loudspeaker; and a personal computer (PC) communicatively coupled to the ADS, and wherein the personal computer comprises: at least one PC processor communicatively coupled to each of the at least two loudspeaker assemblies; a PC input device communicatively coupled to the at least one PC processor; and a PC memory operatively connected with the at least one PC processor, wherein the PC memory stores computer-executable instructions that, when executed by the at least one PC processor, causes the at least one PC processor to execute a method that comprises: receiving an input from the PC input device at the at least one PC processor, the input indicating which one of the at least two loudspeaker assemblies to identify a location thereof; generating a message to be transmitted to the indicated loudspeaker assembly, wherein the message contains commands and data to generate a visual indicator in the indicated loudspeaker assembly; transmitting the message to the indicated loudspeaker assembly; and generating the visual indicator according to the message at the indicated loudspeaker assembly.

According to the fourth aspect of the embodiments, the system further comprises: an external audio source, communicatively coupled to the ADS controller, the external audio source adapted to transmit audio signals to the ADS controller to be broadcast through at least one of the at least two loudspeaker assemblies; and a network server communicatively coupled to the ADS controller and a network, the network server adapted to receive messages through the network, the messages comprising audio information to be broadcast through at least one of the at least two loudspeaker assemblies.

According to the fourth aspect of the embodiments, the at least two loudspeaker assemblies comprises: a first and second loudspeaker assembly are communicatively coupled in parallel to the at least one processor.

According to the fourth aspect of the embodiments, the first and second loudspeaker assemblies are active loudspeaker assemblies, each of which contain at least one amplifier.

According to the fourth aspect of the embodiments, the at least two loudspeaker assemblies comprises: a first and second loudspeaker assembly are communicatively coupled in series to the at least one processor.

According to the fourth aspect of the embodiments, the first loudspeaker assembly is an active loudspeaker assembly and comprises at least one amplifier for amplifying audio signals prior to broadcast by the at least one loudspeaker, and wherein the second loudspeaker assembly is a passive loudspeaker assembly that receives amplified audio from the active loudspeaker assembly.

According to the fourth aspect of the embodiments, each of the at least one loudspeakers in the first and second loudspeaker assemblies are balanced mode radiator loudspeakers.

According to the fourth aspect of the embodiments, the method further comprises: generating a message to be transmitted to the indicated loudspeaker assembly, wherein the message contains commands and data to generate an audio indicator in the indicated loudspeaker assembly; transmitting the message to the indicated loudspeaker assembly; and playing the audio indicator according to the message at the indicated loudspeaker assembly.

According to a fifth aspect of the embodiments, an audio distribution system (ADS) is provided, comprising: at least two loudspeaker assemblies, each of which are adapted to receive digitally encoded audio signals and other digital signals, each of the at least two loudspeaker assemblies having a unique digital address and each comprising at least one loudspeaker; and a mobile device (MD) communicatively coupled to the ADS, and wherein the MD comprises: at least one MD processor communicatively coupled to each of the at least two loudspeaker assemblies; a MD input device communicatively coupled to the at least one MD processor; and a MD memory operatively connected with the at least one MD processor, wherein the MD memory stores computer-executable instructions that, when executed by the at least one MD processor, causes the at least one MD processor to execute a method that comprises: receiving an input from the MD input device at the at least one MD processor, the input indicating which one of the at least two loudspeaker assemblies to identify a location thereof; generating a message to be transmitted to the indicated loudspeaker assembly, wherein the message contains commands and data to generate a visual indicator in the indicated loudspeaker assembly; transmitting the message to the indicated loudspeaker assembly; and generating the visual indicator according to the message at the indicated loudspeaker assembly.

According to the fifth aspect of the embodiments, the system further comprises: an external audio source, communicatively coupled to the ADS controller, the external audio source adapted to transmit audio signals to the ADS controller to be broadcast through at least one of the at least two loudspeaker assemblies; and a network server communicatively coupled to the ADS controller and a network, the network server adapted to receive messages through the network, the messages comprising audio information to be broadcast through at least one of the at least two loudspeaker assemblies.

According to the fifth aspect of the embodiments, the at least two loudspeaker assemblies comprises: a first and second loudspeaker assembly are communicatively coupled in parallel to the at least one processor.

According to the fifth aspect of the embodiments, the first and second loudspeaker assemblies are active loudspeaker assemblies, each of which contain at least one amplifier.

According to the fifth aspect of the embodiments, the at least two loudspeaker assemblies comprises: a first and second loudspeaker assembly are communicatively coupled in series to the at least one processor.

According to the fifth aspect of the embodiments, the first loudspeaker assembly is an active loudspeaker assembly and comprises at least one amplifier for amplifying audio signals prior to broadcast by the at least one loudspeaker, and wherein the second loudspeaker assembly is a passive loudspeaker assembly that receives amplified audio from the active loudspeaker assembly.

According to the fifth aspect of the embodiments, each of the at least one loudspeakers in the first and second loudspeaker assemblies are balanced mode radiator loudspeakers.

According to the fifth aspect of the embodiments, the method further comprises: generating a message to be transmitted to the indicated loudspeaker assembly, wherein the message contains commands and data to generate an audio indicator in the indicated loudspeaker assembly; transmitting the message to the indicated loudspeaker assembly; and playing the audio indicator according to the message at the indicated loudspeaker assembly.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

DETAILED DESCRIPTION

Figure 1:
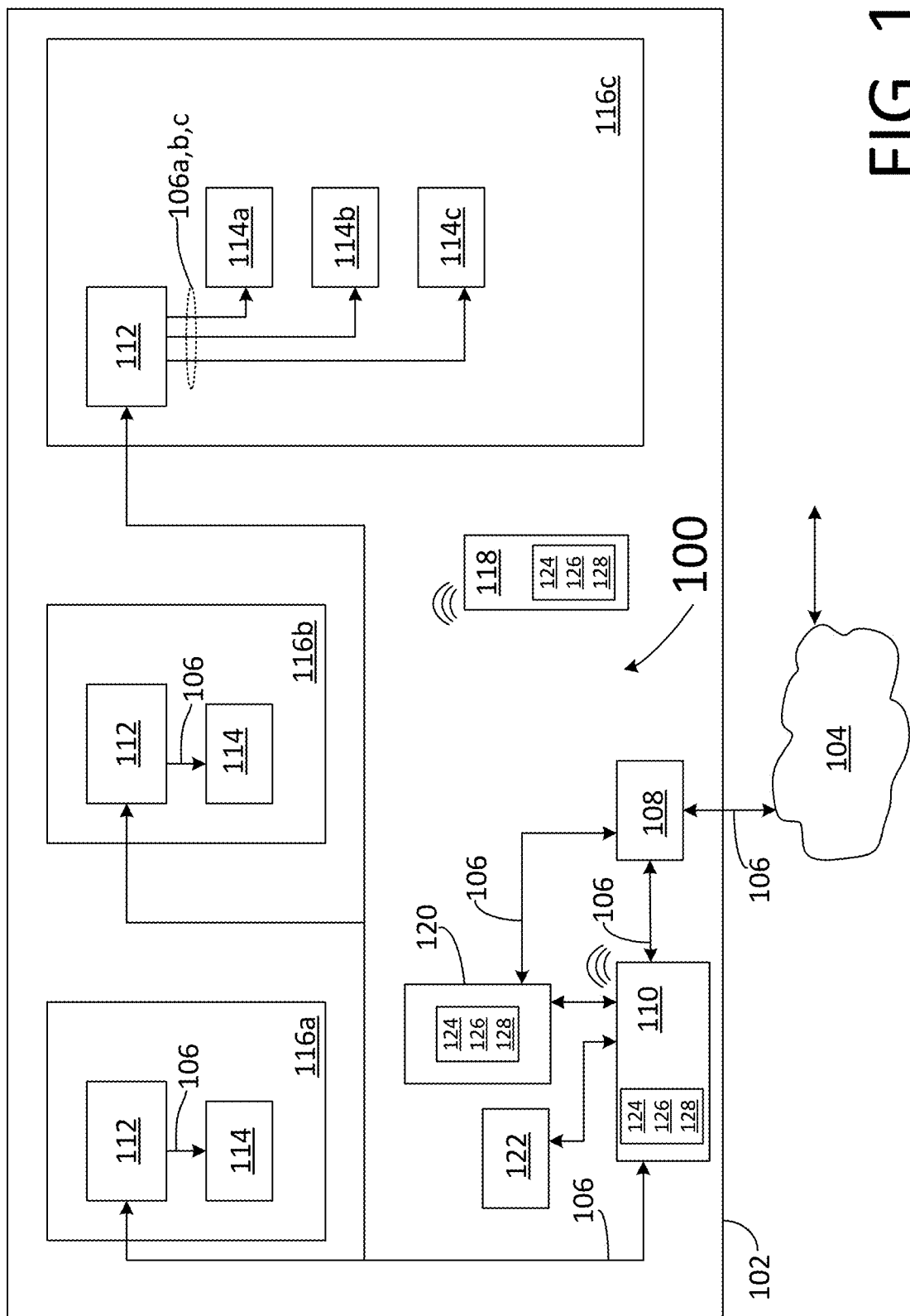
FIG. 1 illustrates a block diagram of an audio distribution system that can verify the location of one or more active and passive loudspeaker assemblies, verify that a connected passive loudspeaker assembly is properly connected, and controls the distribution of power to one or more interconnected active and passive loudspeaker assemblies according to aspects of the embodiments.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as test system, and more particularly to automated test systems of a bi-directional audio communication system for use with teleconferencing systems.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

The different aspects of the embodiments described herein pertain to the context of a systems, methods, and modes for generating a visual indicator to identify a location of a ceiling mounted loudspeaker in an audio distribution system but is not limited thereto, except as may be set forth expressly in the appended claims.

Crestron Electronics Inc. is one of the world's leading manufacturer of control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes for generating a visual indicator to identify a location of a ceiling mounted loudspeaker in an audio distribution system, can be used in loudspeakers system that can be manufactured by Crestron Electronics Inc., located in Rockleigh, NJ.

Used throughout the specification are several acronyms, the meanings of which are provided as follows:

3G Third Generation
4G Fourth Generation
5G Fifth Generation
6G Sixth Generation
ACS Audio Control System
ADC Analog-to-Digital Converter
ADS Audio Distribution System
ALA Active Loudspeaker Assembly
AoIP Audio-over-Internet Protocol
AoE Audio over Ethernet
API Application Programming Interface
App Executable Software Programming Code/Application
ASIC Application Specific Integrated Circuit
BIOS Basic Input/Output System
BMR Balanced Mode Radiator
BT BlueTooth
CD Compact Disk
C-LED Colored Light Emitting Diode
CRT Cathode Ray Tube
DAC Digital-to-Analog Converter
DSP Digital Signal Processor
DVD Digital Video Disk
EEPROM Electrically Erasable Programmable Read Only Memory
FPGA Field Programmable Gate Array
GAN Global Area Network
GPS Global Positioning System
GUI Graphical User Interface
HDD Hard Disk Drive
HDMI High Definition Multimedia Interface
ISP Internet Service Provider
LCD Liquid Crystal Display
LED Light Emitting Diode Display
LTE Long Term Evolution
MED Mobile Electronic Device
MODEM Modulator-Demodulator
NFC Near Field Communications
PC Personal Computer
PDF Portable Document Form
PED Personal Electronic Device
PLA Passive Loudspeaker Assembly
PLVC Passive Loudspeaker Verification Circuit
PoE Power-over-Ethernet
POTS Plain Old Telephone Service
PROM Programmable Read Only Memory
RAM Random Access Memory
ROM Read-Only Memory
RW Read/Write
TP Twisted Pair
USB Universal Serial Bus (USB) Port
UV Ultraviolet Light
UVPROM Ultraviolet Light Erasable Programmable Read Only Memory
UWB Ultra Wide Band
VGA Video Graphics Array
Xcvr Transceiver The following is a list of the elements of the Figures in numerical order:

100 PoE Loudspeaker Power Distribution and Audio Sound Quality Improvement Network (Audio Distribution System (ADS))
102 Enterprise Location
104 Network System (Internet)
106 Ethernet Cable (CAT5; 4 twisted pairs, eight wires total)
108 Network Server
110 Audio System Controller (ASC)
112 Active Loudspeaker Assembly (ALA)
114 Passive Loudspeaker Assembly (PLA)
116 Conference Room
118 Mobile Electronic Device (MED)
120 Personal Computer/Laptop (PC)
122 External Audio Source (Analog/Digital) [Mic, CD Player, Turntable; Stereo System. among others)
124 Processor
126 Memory
128 Audio Control System Application (ACS App)
204 RJ45 Ethernet Connector (Male/Female)
206 Power-over-Ethernet (PoE) Extractor Circuit
208 Ethernet Transceiver
210 Active Loudspeaker Assembly (ALA) Controller
212 Digital Signal Processor (DSP)
214 Audio Amplifier (Amp)
216 Loudspeaker
218 Passive Loudspeaker Verification Circuit
220 Loudspeaker Assembly Visual Identifier Circuit
222 I2S Digital Audio Signal
224 Controller Control/Data/Digital Signals
226 Analog Audio Signal
228 Passive Loudspeaker Assembly (PLA) Connection Status Signal
302 Passive Loudspeaker Assembly Verification Resistor (R302)
304 Verification Circuit Digital Interface
306 Analog-to-Digital Converter (ADC)
308 $V_{Status(D)}$
310 Differential Amplifier
400 Method for Setting-up Active and Passive Loudspeaker System
402-410 Steps of Method 400
500 Method for Operating Active and Passive Loudspeaker System
502-518 Steps of Method 500
601 Shell/Box
602 Integrated Display/Touch-Screen (laptop/tablet etc.)
604 Internal Data/Command Bus (Bus)
606 Processor Internal Memory
608 Processor(s)
610 Universal Serial Bus (USB) Port
611 Ethernet Port
612 Compact Disk (CD)/Digital Video Disk (DVD) Read/Write (RW) (CD/DVD/RW) Drive

614 Floppy Diskette Drive
616 Hard Disk Drive (HDD)
618 Read-Only Memory (ROM)
620 Random Access Memory (RAM)
622 Video Graphics Array (VGA) Port or High Definition Multimedia Interface (HDMI)
624 External Memory Storage Device
625 VGA/HDMI Cable
626 External Display/Touch-Screen
628 Keyboard
630 Mouse
632 Processor Board/PC Internal Memory (Internal Memory)
634 Flash Drive Memory (Storage Media)
636 CD/DVD Diskettes (Storage Media)
638 Floppy Diskettes (Storage Media)
642 Wi-Fi Transceiver
644 BlueTooth (BT) Transceiver
646 Near Field Communications (NFC) Transceiver
648 Third Generation (3G), Fourth Generation (4G), Fifth Generation (5G), Sixth Generation (6G) Long Term Evolution (LTE) (3G/4G/5G/6G/LTE) Transceiver
650 Communications Satellite/Global Positioning System (Satellite) Transceiver Device
652 Antenna
656 Universal Serial Bus (USB) Cable
658 Ethernet Cable (CAT5)
660 Scanner/Printer/Fax Machine
706 Internet Service Provider (ISP)
708 Modulator/Demodulator (Modem)
710 Wireless Router
712 Plain Old Telephone Service (POTS) Provider
714 Cellular Service Provider
718 Communication Satellites
720 Cellular Telecommunications Service Tower (Cell Tower)
724 GPS Station
726 Satellite Communication Systems Control Station
728 Global Positioning System (GPS) Satellite
800 "Main Menu" Window
802 Monitor/Display Screen (Screen)
806 "Find Existing ALA-PLA Set(s)" Graphical User Interface (Find GUI)
808 "Aural/Visual Identification" GUI
810 "Run/Operate Audio System" GUI
812 Inactive Pointer
814 Active Pointer
900 "Find" Window
902 "Name of Audio System" Field
904 "Generate Map?" Button
906 "Save Button"
908 "Edit" Button
910 "Display ALA-PLA Names/Addresses" Field
912 "Error Reports" Field
914 "Return to Main Menu" Button
1000 "Aural/Visual Identification" Window
1002 "Loudspeaker Assembly" List
1004 "Aural Test" Column of Buttons
1006 "Visual Test" Column of Buttons
1008 "Aural & Visual Test" Column of Buttons
1010 "Run Test" Column of Buttons
1012 "Pass?" Column of Buttons
1014 "Fail?" Column of Buttons
1016 "Select ALA-PLA" Field
1018 "ALA-PLA" Pull-Down Button
1100 "Run Audio System" Window
1102 "List of Known IP Based Audio Providers" Field
1104 Power Operating Mode Selection Column of Buttons
1106 "Digital Signal Processor (DSP) Programs" List
1110 "Set-up Power Level(s) for Direct Assignment" Button
1200 "Direct Assignment Power Operating Mode Setup" Window
1202 "Loudspeaker Located in Selected ALA-PLA" Field
1204 "Output Level" Slide Bar
1206 "Total Power Remaining in ALA-PLA Set" Window
1300 "Selected ALA-PLA Map View" Window
1302 "Name of Room" Field
1304 Table FIG. 1 illustrates a block diagram of audio distribution system (ADS) 100 that can verify the location of one or more active and passive loudspeaker assemblies 112, 114, verify that a connected passive loudspeaker assembly 114 is properly connected, and controls the distribution of power to one or more interconnected active and passive loudspeaker assemblies 112, 114 according to aspects of the embodiments.

ADS 100 can be used in an enterprise location 102, such as a corporate entity, a public/private commercial building, a home, a government building, among other types of buildings wherein high-quality audio distribution is desired. ADS 100 interconnects with network system 104 through network server 108, and comprises one or more of personal computer (PC) 120, mobile electronic device (MED) 118) (which can be a cell phone, tablet, laptop, or any other type of electronic communication device), ethernet cable (CAT5) 106, audio system controller (ASC) 110, one or more external audio sources 122, one or more active loudspeaker assemblies (ALA) 112, and one or more passive loudspeaker assemblies (PLA) 114 according to aspects of the embodiments. ALAs 112 can be installed in their own conference room 116, or ALAs 112 can be paired with one or more PLAs 114 in a conference room 116. As shown in FIG. 1, there are three conference rooms 116a,b,c, and the first two conference rooms have a pair of ALAs 112 and PLA 114, while conference room 116c contains ALA 112 and four PLAs 114a-d. In ADS 100, an ALA 112 can stand alone, or can be paired with up to practically any number of PLAs 114; however, in ADS 100 PLA 114 is generally not used alone as it does not include any amplification circuitry, though aspects of the embodiments can include this feature if desired.

In installing ADS 100, installers would locate ASC 110 in a location that is network accessible via ethernet cable 106, or via a wireless connection (not shown), via WiFi or some other wireless medium. ASC 110 can receive remotely located commands and/or audio through network server 108 and network system 104. PC 120 can be in the form of desktop computer, laptop, tablet, personal digital assistant, or practically another type of computing device that has processor 124, memory 126, and a copy of audio control system (ACS) application (App) 128 stored in memory 126. Thus, MED 118 can also store a copy of ACS App 128, and can communicate via Bluetooth, WiFi, near field communications (NFC), ultra-wideband (UWB) technologies with ACS 110 according to aspects of the embodiments. External audio sources 122 can also be connected to ASC 110 via hardwired or wireless interfaces, and can provide audio such as music or voice (via a microphone, not shown). External audio source 122 can include an analog or digital stereo, radio, compact disk player, turntable, mic/public announcement system, among other sources of audio.

In FIG. 1 there are shown three conference rooms 116a-c in enterprise location 102, although such is not to be taken in a limiting manner, as most enterprise locations will have more than three conference rooms. When installing ADS 100, each of ALA 112 and PLA 114 are designed to be installed in a standard 2'×4' ceiling tile location. In addition, ALA 112 is connected to ASC 110 via ethernet cable 106, which is a CAT5 Ethernet cable, as the audio signal is transmitted digitally using Audio-over-Internet protocol (AoIP). If, in the particular location that ALA 112 is installed, the system designers decide to also install one or more PLAs 114, each of those are connected to ALA 112 using ethernet cable 106 as well. According to aspects of the embodiments, and as described in greater detail below in regard to FIGS. 3 and 4, use of ethernet cable 106 properly identifies the connected device as a passive loudspeaker assembly and provides ACS App 128 the ability to differentiate PLAs 114 from other types of devices that happen to have Ethernet connectors, but which are not loudspeakers.

Figure 2:
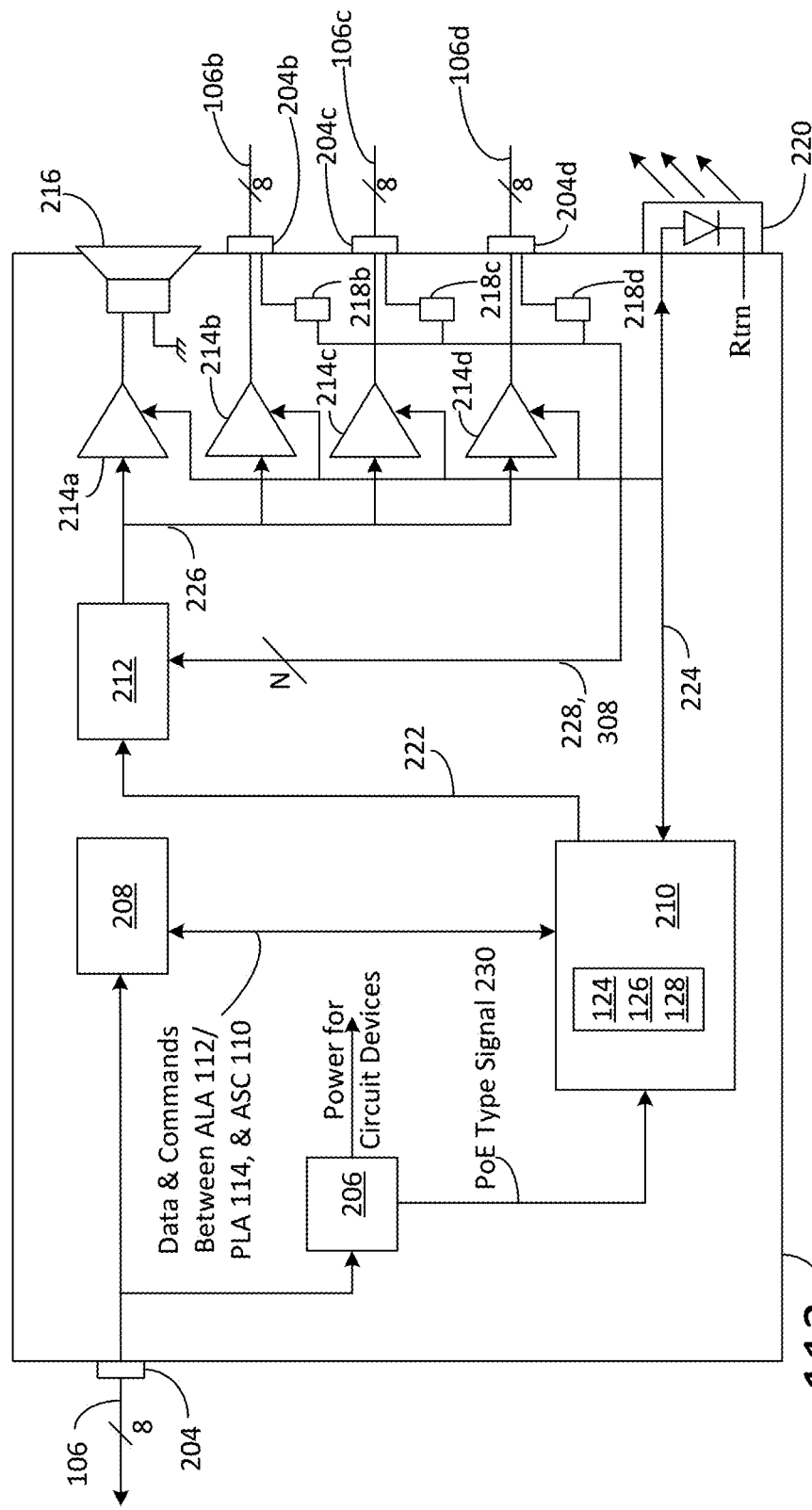
FIG. 2 illustrates a block diagram of an active loudspeaker assembly used in the audio distribution system of FIG. 1 according to aspects of the embodiments.

Attention is now directed to FIG. 2, which illustrates a block diagram of ALA 112 used in ADS 100 according to aspects of the embodiments. ALA 112 comprises a shell/case to contain the elements of ALA 112, Power-over-Ethernet (PoE) extractor circuit 206, Ethernet transceiver 208, digital signal processor (DSP) 212, one or more audio amplifiers (Amp(s)) 214, loudspeaker 216, loudspeaker assembly visual identifier circuit 220, and optionally, passive loudspeaker verification circuit (PLVC) 218. While PLVC 218 is optional in the sense that a passive loudspeaker does not necessarily need to be used with an active loudspeaker, it would generally be the case that ALA 112 would be manufactured with at least one if not several ports for PLAs 114 to be interconnected to ALA 112, with each port including a separate Amp 214, and PLVC 218 according to aspects of the embodiments.

ALA 112, and any other active device that relies on ALA 112, can be referred to as a "powered device" or PD, and from which it derives its power from a power sourcing equipment (PSE) that provides PoE.

ALA 112 is an "active" device in that it contains all the circuitry and components needed to receive AoIP signals, as well as other IP based messages, process received AoIP and other IP signals, convert the digital audio signals to an analog signal and amplify them (using a Class-D amplifier, though that need not necessarily be the case, in that a separate digital-to-analog converter (DAC) can be included and a different type of amplifier used), and process the digital audio signals using a DSP (although, some/all of the DSP functions can be implemented using analog circuitry, but which are not shown). In addition, ALA 112 further comprises PLVC 218 that includes active circuitry to process the verification signal from a correctly connected PLA 114, and transmit an output to ALA controller 210. ALA controller 210 can further receive IP commands and instructions, as well as the AoIP signals, and process all of the signals, and report back status information to ASC 110 according to aspects of the embodiments. ALA controller 210 outputs AoIP signals (i.e., audio data) to DSP 212 as a I2S digital audio signal 222, though other forms of transmitting audio data are possible in either or both digital and analog form. According to further aspects of the embodiments, use of ethernet cable 106 and PLVC 218 ensures that the polarity of the signals output from Amps 214 are not swapped when interconnecting different PLAs 114 to ALA 112; it is entirely possible that if such ethernet cable 106 and PLVC 218 were not used, a first and second PLA 114 could be connected with their polarities opposite to that of each other, and audio dropouts could occur in some locations because the audio output from the two different PLAs 114 would be 180° out of phase with each other. Other advantages include that special equipment is not needed to cut and strip speaker wires.

IP signals are transmitted from ASC 110 and received by Ethernet transceiver 208, and IP signals can be transmitted by Ethernet transceiver 208 and received by ASC 110. The bi-directional IP signals can contain AoIP signals, status signals, command and control signals, and the like. Power is extracted from ethernet cable 106 (CAT5 Ethernet cable) by PoE extractor circuit 206 and provided to all of the active circuitry in ALA 112, including audio Amps 214. ALA controller 210 extracts the digital audio signals from the AoIP signals and provides the same to DSP 212. According to aspects of the embodiments, audio signals are transported to ADS 100 as ethernet signals, which are received by Ethernet transceiver 208, output to ALA controller 210, which decodes the ethernet audio packets, converts them to I2S and sends it to DSP 212. DSP 212 provides equalization, bass boosting and other signal processing functions before passing the audio along to Amps 214. DSP 212 processes the digital audio signals according to a stored set of parameters, or can be actively controller by a user of ADS 100 via ASC 110 and ACS App 128 according to aspects of the embodiments. That is, upon initialization of ADS 100, DSP 212 can have pre-loaded parameters for processing audio signals, which can be selected manually when audio is present or about to be present, or one of the one or more pre-loaded parameters can automatically set to be used as soon DSP 212 is powered up.

The output of DSP 212 is transmitted to one or more Amps 214. If in the conference room 116 or the area that ADS 100 is being used there is only need for one loudspeaker, then there would be only one loudspeaker 216 connected to a respective Amp 214. For large areas, however, or for more complete audio coverage, an ALA 112 and one or more PLAs 114 can be used. For the purposes of this discussion, it will be presumed that the setup is similar to that shown in FIG. 1, for conference room 116c; that is, one ALA 112 and three PLAs 114a-d. According to aspects of the embodiments, there is practically no limit to the number of amplifiers that can be connected to the output of DSP 212 other than physical constraints such as current output, heat sink requirements, and the like.

Figure 4:
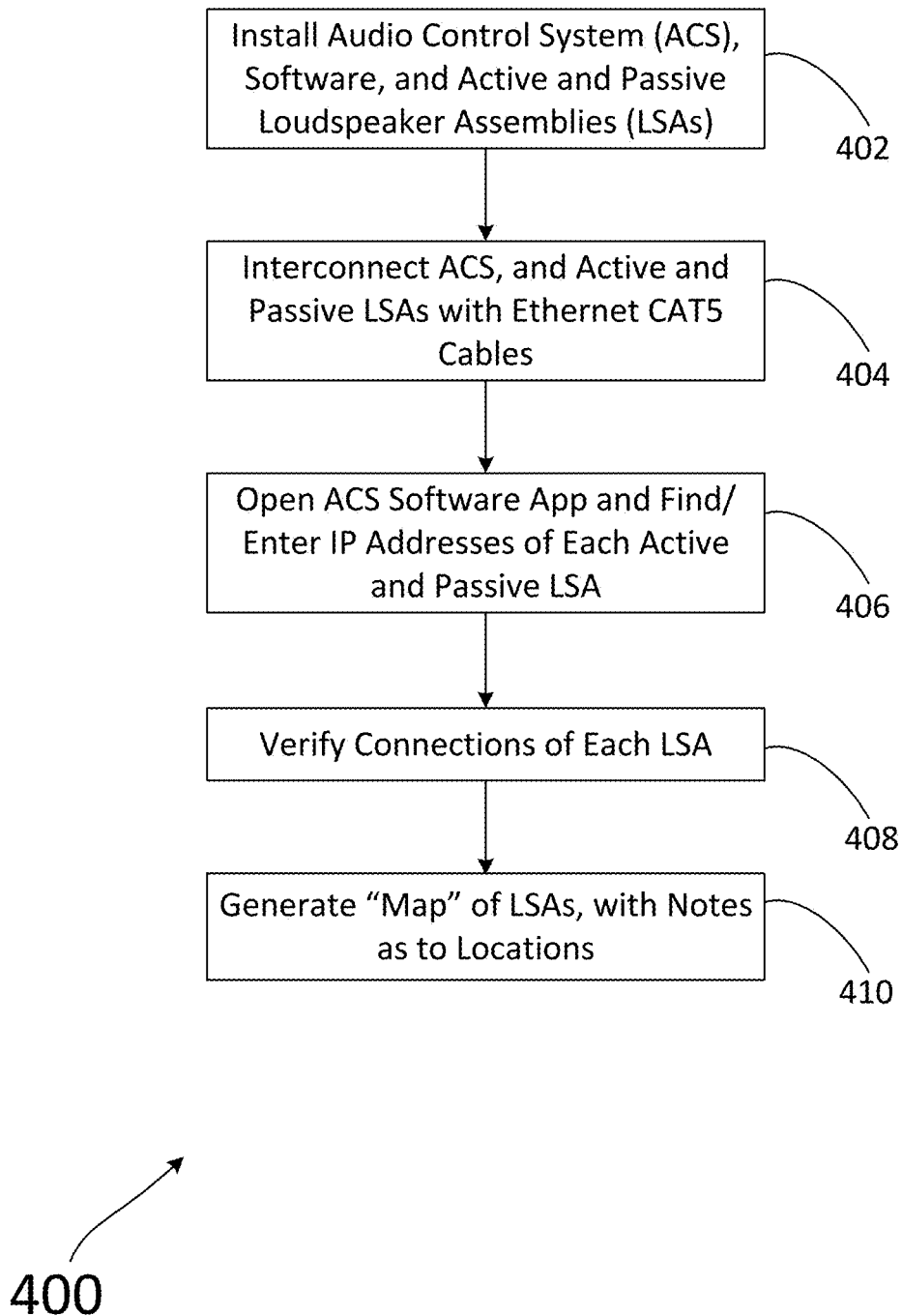
FIG. 4 is flowchart of a method for setting up the audio distribution system shown in FIG. 1 according to aspects of the embodiments.

According to aspects of the embodiments, the output of DSP 212 is analog audio signal 226 and is input to one or more Amps 214. Amp 214a is connected to loudspeaker 216; in this case, a balanced mode radiator (BMR) loudspeaker, though that need not necessarily be the case. Furthermore, each of the loudspeakers in each PLA 114 can also be BMR loudspeakers, as shown in FIG. 4. BMR technology allows for a considerably broader dispersion angle and therefore permits a given loudspeaker to cover a broader region of a room 116.

According to further aspects of the embodiments, ADS 100 can locate each ALA 112 (and PLA 114) via a visual indicator and an aural signal (or an audio indicator. Such audio indicator and/or or aural signal (described below as a pre-stored sound signal) can be in the form of a tone, a plurality of tones (of the same or different amplitudes), a voice (real or simulated), a plurality of voices (any combination of real or simulated voices), a song or a sample of a song, a natural sound (such as a bird singing, water in a brook, beach, rain storm, lightning, rocks hitting each other, and the like), artificially/computer generated sounds, real or artificial instruments, mechanical sounds (e.g., engines, machines, and the like), among other types of sounds.

In regard to the former, a signal can be generated and transmitted from ASC 110 in response to an input from user (whom can be either locally or remotely located) to MED 118, PC 120 or as a direct input to ASC 110, all in use with ACS App 128. That is, in response to an input from the user, ACS App 128 generates a command that is transmitted from ASC 110 through ethernet cable 106 to a particular ALA 112 (or PLA 114). According to aspects of the embodiments, and as described in greater detail below, upon configuration, each ALA 112 and PLA 114 is "found" by ASC 110 and its internal IP address noted. In addition, a description can be added in a "notes" section that describes the physical location of each ALA 112 and PLA 114 (e.g., "ALA 112a is located directly in front of the podium at the South end of the board room"). Once such a list is generated, a user can refer to it and generate the visual indicator command for the particular ALA 112 and/or PLA 114 and a visual indication will be generated for either a predetermined period of time, or for a programmed period of time. Such visual indicator commands are received by ALA controller 210, which then generates a signal transmitted as controller control/data/digital signals 224 to loudspeaker assembly visual identifier circuit 220, which displays the visual indication for the predetermined period of time. Loudspeaker assembly visual identifier circuit 220 can be one or more light emitting diodes (LEDs), liquid crystal displays (LCDs), or other type of light generating device/display. In FIG. 2, loudspeaker assembly visual identifier circuit 220 is shown to comprise C-LED$_1$, which can be a red colored LED, and CLED$_2$, which can be a blue colored LED. In a substantially similar manner, ALA controller 210 can also generate an aural signal to be broadcast from loudspeaker 216 on each of ALA 112, PLA 114 as selected by the user. That is, the user can select "Aural Identification" in ACS App 128 and ASC 110 will generate a command that includes a pre-stored sound signal that will be broadcast by the selected ALA 112, or PLA 114, in a substantially similar manner as that as the visual identification signal. According to further aspects of the embodiments, each ALA 112 and PLA 114 can have their own unique visual identification signal and/or unique aural identification signal assigned to them.

Figure 3:
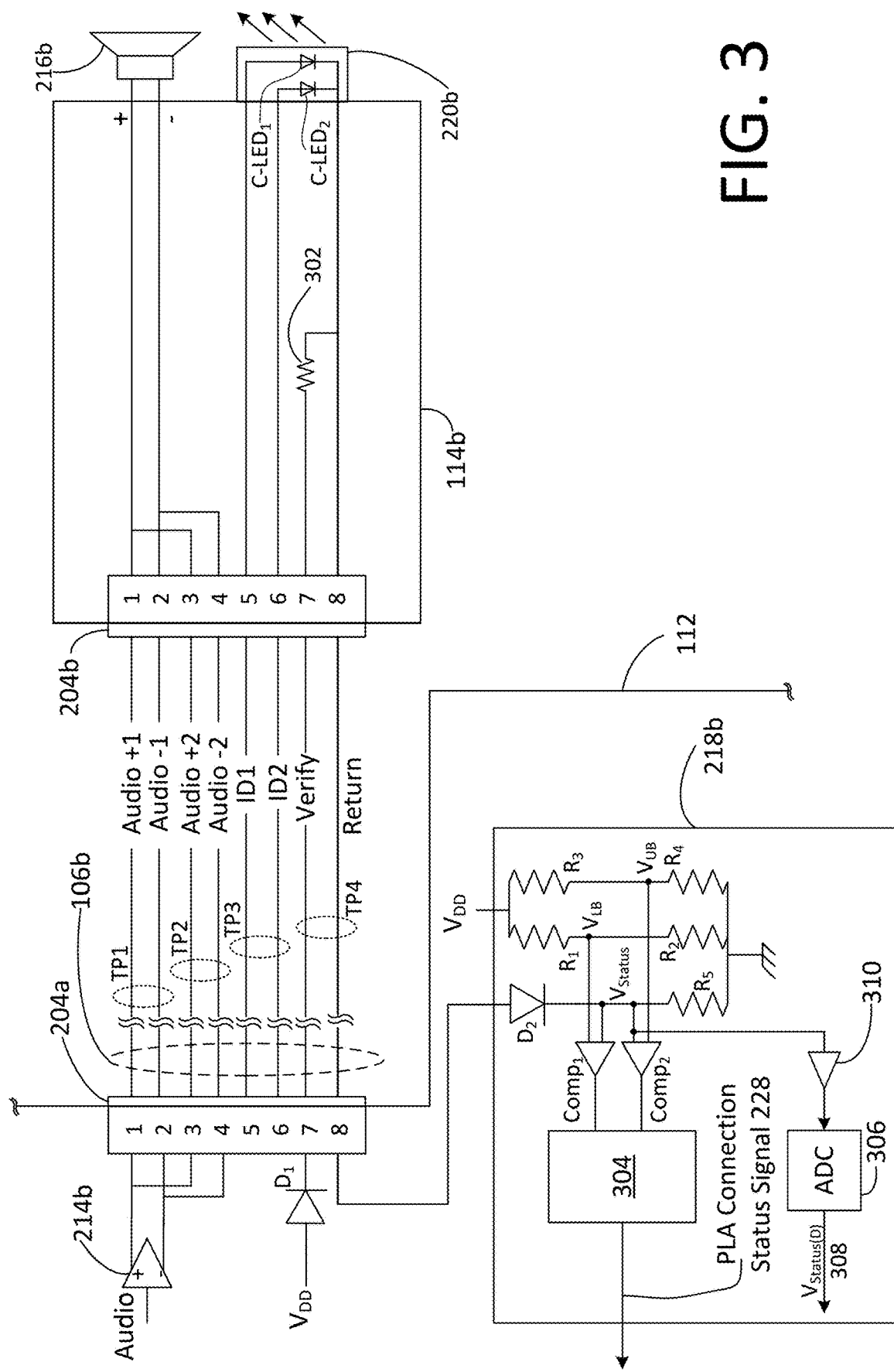
FIG. 3 illustrates a block diagram of a passive loudspeaker assembly and its interconnection to an active loudspeaker assembly as used in the audio distribution system of FIG. 1 according to aspects of the embodiments.

According to further aspects of the embodiments, each PLA 114 is connected to the output of an Amp 214 via ethernet cable 106, which is an Ethernet CAT5 cable with 4 twisted pairs (TP) of conductors, the details of which are shown in FIG. 3. Two of the conductors in ethernet cable 106 that connects ALA 112 to PLA 114 are dedicated towards detection of a passive loudspeaker assembly such that other types of Ethernet devices are not inadvertently connected to ALA 112 (and consequently to the output of Amp 214x). Detection of a properly connected PLA 114 is show and discussed in regard to FIG. 4, described in greater detail below.

FIG. 3 illustrates a block diagram of PLA 114 and its interconnection to ALA 112 as used in ADS 100 as shown in FIG. 1 according to aspects of the embodiments. Referring to FIGS. 1-3 it can be seen that digital audio signals routed to ALA 112 in conference room 116 by ASC 110 are also distributed to PLAs 114a-c via ethernet cables 106a-c, each of which comprise four twisted pairs (TPs). FIG. 2 illustrates, in part, an analog audio signal output portion in which the output of DSP 212 is transmitted to Amp 214a, the output of which is connected to BMR loudspeaker 216. The analog output of DSP 212 is also sent to Amps 214b-d, the outputs of which are connected to PLAs 114a-c, respectively (not shown) via ethernet cables 106a-c, respectively. Attention is now directed to Amp 214b, ethernet cable 106a, and PLA 114a shown in FIG. 3.

In FIG. 3, ethernet cable 106a is shown to have four TPs of lines. Two of the twisted pairs, in this case TP1 and TP2, provide an electrical connection between the output of Amp 214a and the loudspeaker 216. Two sets of TPs are used in parallel to minimize transmission losses and thereby maximize power delivered to the loudspeaker; other embodiments however could use additional conductors in parallel or, only use a single pair of conductors. The conductors are assigned so that each pair is a differential connection, carrying current (from Amp 214a) to the speaker on one wire and the associated return-current on its mate; this approach is employed to minimize radiated emissions. This need not necessarily be the case, however. TP3 of ethernet cable 106a carries identification signals (ID1, ID2) to loudspeaker assembly visual identifier circuit 220 (a bi-color LED, or display of some type, as described above). TP4 is used for both PLA verification and as the return for the visual identifiers. According to further aspects of the embodiments, the voltage supplied by Verify can be used by other active components that can be located in PLA 114.

According to aspects of the embodiments, PLVC 218, has been implemented within ALA 112 circuit. PLVC 218 reads the value of passive loudspeaker assembly verification resistor 302 (R302) located in PLA 114. By doing so, the ALA is able to determine that the connected device is PLA 114. According to aspects of the embodiments, implementation of PLVC 218 provides a low-cost means of securely verifying that a device connected to ALA 112 is a PLA 114. PLVC 218 comprises simple resistor dividers and a comparator. In operation of PLVC 218, a test voltage is applied to line 7 of TP4 in ethernet cable 106 (the "Verify" line) through blocking diode D$_1$. If PLA 114 is present, R302 forms a circuit, allowing an injection current to pass through resistor R302, diode D2 and resistor R$_5$ of PLVC 218. The voltage at the node of R$_5$ and D$_2$ (V$_{status}$) can be approximated by the following equation:

$$V_{Status} = \frac{(V_{DD} - 2V_{fwd}) \times R_5}{R_5 + R_{302}}$$

V$_{status}$ is checked against an upper bound and lower bound of voltage measurements, V$_{UB}$ and V$_{LB}$, respectively, by comparators Comp$_1$ and Comp$_2$ (also part of PLVC 218).

$$V_{UB} = \frac{V_{DD} \times R_4}{R_3 + R_4}$$

$$V_{LB} = \frac{V_{DD} \times R_2}{R_1 + R_2}$$

The outputs of Comp$_1$ and Comp$_2$ are received by verification circuit digital interface 304 (also part of PLVC 218), which receives the outputs of the comparators and generates a verification status signal, PLA connection status signal 228, which is then transmitted to DSP 212 according to aspects of the embodiments. According to aspects of the embodiments, if V$_{status}$ is between V$_{UB}$ and V$_{LB}$, then PLA connection status signal 228 reports a good connection between ALA 112 and PLA 114, which implies a good cable connected properly. If either of V$_{UB}$ or V$_{LB}$ is exceeded, then PLA connection status signal 228 will not report a good connection, i.e., a failed connection, which can signify a bad ethernet cable 106, or a good or bad ethernet cable 106 connected to the wrong piece of electronic equipment.

In ALA 112 there is a PLVC 218 for each PLA connector 204; in the non-limiting example shown in FIG. 2 there are three such PLVCs 218a-c for PLAs 114a-c, connected to ALA 112 via ethernet cables 106a-c, respectively. After DSP 212 receives PLA connection status signal 228 it transmits the same to ASC 110: if PLA connection status signal 228 is good, meaning $V_{status}$ is within $V_{UB}$ and $V_{LB}$, then ASC 110 will allow audio signals to be transmitted to the respective PLA 114 for which the "good" status signal has been received; if the status signal is "bad" or not good, then no audio will be allowed to be transmitted. ASC 110 can inform the user that either an error condition exists or that no PLA 114 is connected to the respective ALA 112.

According to further aspects of the embodiments, each connector 204a-c, PLVC 218, and hence PLA connection status signal 228 can include an identifier so that the user knows exactly which PLA 114 is either in an error condition, or not connected properly, or inoperative for some reason (e.g., ethernet cable 106 can be improperly wired, or damaged). In this manner a user can be assured that ADS 100 is properly connected and no mis-wirings exist.

According to further aspects of the embodiments, the comparator-based implementation of PLVC 218 can instead be implemented using an analog-to-digital converter (ADC). That is, Comp1 and Comp2 can instead be replaced with an ADC (not shown) that can digitize the voltage values and transmit them to verification circuit digital interface 304, wherein logic can be used to generate PLA connection status signal 228. According to further aspects of the embodiments, resistor R302 can be replaced with a short. According to further aspects of the embodiments, different values of 8302 can be used to differentiate different types of passive speakers (e.g., different makes, models, speaker impedances, etc.); once decoded by PLVC 218, this information can be used to inform the user and/or to automatically adjust DSP 212 tuning parameters to optimize audio performance. According to further aspects of the embodiments, any combination of these potential implementations maintains the ability to ensure positive identification of a valid PLA 114, the presence of a valid PLA 114, and/or a bad or missing ethernet cable 106 between ALA 112 and PLA 114.

According to further aspects of the embodiments, PLA connection status signal 228 can be used by controller 210 to evenly distribute power among the different loudspeakers 216 that might be part of a "branch" of ALA 112 and one or more PLAs 114. That is, if there is one ALA 112 and one PLA 114, controller 210 verifies that a correctly connected PLA 114 is connected to the ALA 112, and can adjust the power available from PoE extractor circuit 206 by splitting the power available from PoE extractor circuit 206 to Amp 214a (for loudspeaker 216a connected to ALA 112), and Amp 214b located in ALA 112, but which goes to PLA 114 and its loudspeaker 216b. The power can be split by either sending commands to DSP 212 or to Amps 214a,b to control their output. In this manner, the power is split evenly (e.g., about 50% to each of ALA 112 and PLA 114), or can be split in any manner desired between the ALA 112 loudspeaker 216a and PLA 114 and its loudspeaker 216b. If, for some reason, PLA 114 is not properly connected, or a break in ethernet cable 106 that connects them occurs, PLA connection status signal 228 indicates that no PLA 114 is properly connected and controller 210 can respond as appropriate; commit 100% of the power available to the existing loudspeaker 216a, or some other lesser amount.

According to further aspects of the embodiments, audio signals received via network system 104 can be encrypted using proprietary encryption methods, which can then be de-crypted by ACS App 128 in ASC 110. If an unsecured device is detected in ADS 100, ACS App 128 can convert or ask all devices in ADS 100 to use unencrypted communications, such as AES-67. AES67 is a technical standard for audio over IP and audio over Ethernet (AoE) interoperability. The standard was developed by the Audio Engineering Society and first published in September 2013. It is a layer 3 protocol suite based on existing standards and is designed to allow interoperability between various IP-based audio networking systems. AES67 defines requirements for synchronizing clocks, setting QoS priorities for media traffic, and initiating media streams with standard protocols from the Internet protocol suite. AES67 also defines audio sample format and sample rate, supported number of channels, as well as IP data packet size and latency/buffering requirements.

According to further aspects of the embodiments, ASC 110 can disable the analog inputs of Amps 214 through controller control/data/digital signals 224 issued by ALA controller 210 and/or ASC 110. Disabling the analog inputs to Amp 214 can minimize noise output by unused Amps 214.

According to further aspects of the embodiments, multiple status indicators can be implemented through the use of analog-to-digital converter (ADC) 306, which digitizes $V_{sta-tus}$ signal into $V_{status(D)}$ 308. ADC 306 can be an n-bit ADC, and as those of skill in the art can appreciate, can output the digitized data in either a serial or parallel stream of bits. $V_{status(D)}$ 308 can be a separate data signal, as shown in FIG. 2, or can be multiplexed with PLA connection status signal 228 as one data signal line input to DSP 212, and DSP 212 and/or ALA controller 210 can control the flow of data from PLVC 218; such control and interconnections can be readily understood and appreciate by those of ordinary skill in the art, and therefore, in fulfillment of the dual purposes of clarity and brevity, a detailed discussion thereof has been omitted from herein.

ADC 306 digitizes the voltage status signal, which is the voltage drop across resistor R302; by changing the value of resistor R302, not only can correct interconnection be verified (as described above), but different information can be "encoded" into the value of resistor R302. Optional differential amplifier 310 is shown in FIG. 3, wherein the voltage range of the signal input to ADC 306 can be shifted/modified as needed to ensure suitable resolution by ADC 306, according to aspects of the embodiments. Other types of circuits can be used to shift/modify the input signal as well, or no circuit need be used, as the case may be.

$V_{Status}$ is checked against an upper bound and lower bound of voltage measurements, $V_{UB}$ and $V_{LB}$, respectively, by comparators $Comp_1$ and $Comp_2$ (also part of PLVC 218). Within the range determined by $V_{UB}$-$V_{LB}$, different $V_{status(D)}$ 308 voltages (as determined by R302, $R_{1-5}$, and VDD) can provide several facets of information, or "determinations," as shown in Table I below to the user of ADS 100 and ACS App 128. The determinations include: (I) Determining the number of connected loudspeakers; (II) Determining loudspeaker impedances; and (III) Determining loudspeaker maximum power handling capabilities. Based on these determinations, ACS App 128 and/or a user of ADS 100 can then operate ADS 100 in one of three power allocation modes: (A) Power Handling; (B) Intelligent Power Allocation/Steering; and (C) Direct Assignment.

According to aspects of the embodiments, encoding and determining loudspeaker impedances can be used to factorin information about the total available power. From a practical perspective, input power information would take the form of PoE Class identification (e.g., Class 2=3.84 W, Class 3=12.95 W, Class 6=62 W, among others).

As described herein, ALAs 112 are powered by PoE utilizing commonly available circuitry. The maximum input power available to ALA 112, which can be referred to as a "PoE-PD" device, will depend on the upstream equipment, e.g., ASC 110, which can be referred to as a PoE-PSE device. For example, if the upstream equipment (ASC 110) contains an "IEEE 802.3at Type 1" PSE device, then ALA 112 can use up-to (but not exceeding) 13 W. If the upstream equipment contains an "IEEE 802.3at Type 2" PSE device, then ALA 112 can use up to (but not exceeding) 25 W. If the upstream equipment contains an "IEEE 802.3at Type 3" PSE device, then ALA 112 can use up to (but not exceeding) 51 W. As those of skill in the art can appreciate, PoE extractor circuit 206, found in ALA 112, outputs PoE Type Signal 230 to ALA controller 210 that indicates the "type" of PoE that was negotiated with the PSE (i.e., how much power it is allowed to consume). ALA controller 210 can use that information to define the maximum power available for its own loudspeakers and for each of the downstream PLAs 114. Furthermore, knowing the total available power, the number of connected loudspeakers and the impedance of attached loudspeakers in PLAs 114, the device can intelligently and dynamically allocate the power. Allocation schemes can be designed to result in substantially equal acoustic power for all loudspeakers, substantially equal electrical power, or intentionally skewed. A user can either program ALA 112, or it can be set to run in a default mode pre-determined by the DSP.

As those of skill in the art can appreciate, loudspeakers are manufactured with a wide array of impedances (e.g., 4Ω, 6Ω, 8Ω, 16Ω). The impedance of a loudspeaker has a significant impact on the power consumed by the audio system. For any given amplifier driving voltage, a lower impedance loudspeaker will consume more power; this relationship is substantially linear, meaning that a 4Ω loudspeaker will consume four times the power of a 16Ω loudspeaker. To fully utilize all available input power, output levels of the amplifier must be fine-tuned to compensate for the impedances of the loudspeakers connected to the amplifier outputs. This is particularly important in power-constrained applications, such as a PoE-based amplifier.

If an amplifier is designed to deliver a certain amount of power (e.g., 10 watts (or 10 W) to an 8Ω loudspeaker, and a 4Ω loudspeaker is wired to the amplifier instead, then the amplifier will draw excessive power from the upstream PoE-PSE. The upstream PoE-PSE will observe the excessive power and enforce the IEEE 802.3 limits, cutting power to the ALA. Thus, knowing the impedance of a connected PLA 114 is important to preserve the integrity of ADS 100 and its operation.

The following paragraphs discuss the three determinations enabled by use of $V_{status(D)}$ 308.

(I) Determination of Number of Connected Loudspeakers. Each amplifier output has an associated PLA connection circuit (218). If $V_{status}$ falls within the $V_{UB}$ and $V_{LB}$ limits, the associated digital signal is generated, indicating the presence of a valid loudspeaker connection. By counting the number of valid connections, the ALA can establish the total number of loudspeakers in that particular installation.

(II) Determination of Loudspeaker Impedances. According to aspects of the embodiments, resistor R302 can be used to encode loudspeaker impedances. As described above, $V_{status}$ can be digitized by ADC 306 into $V_{status(D)}$ 308, and in-turn, mapped onto an associated impedance. By way of non-limiting example, a 4Ω loudspeaker 216 in PLA 114 can be defined as $V_{status(D)}$ 308 being equal to 2.2 VDC, a 6Ω loudspeaker 216 can be defined as $V_{status(D)}$ 308 being equal to about 2.4 VDC, an 8Ω loudspeaker 216 can be defined as $V_{status(D)}$ 308 being equal to about 2.6 VDC, and a 16Ω loudspeaker 216 can be defined as $V_{status(D)}$ 308 being equal to about 2.8 VDC.

(III) Determination of Loudspeaker Maximum Power Handling. According to further aspects of the embodiments, additional information concerning each of the loudspeakers 216 in PLAs 114 can be encoded into the digitized status voltage $V_{status(D)}$ 308. Such information can include power ratings for the respective loudspeakers in the particular PLA 114. As those of skill in the art can appreciate, a 4Ω loudspeaker can be rated to safely handle 10 W, 50 W, or even 100 W. Such power ratings can be incorporated into the resistor R302— i.e., using a precision resistor of a predetermined value—to yield different $V_{status(D)}$ 308 voltages to indicate not only the nominal impedance, but also the power rating. Table I below illustrates a non-limiting example of how such information can be encoded into $V_{status(D)}$ 308:

TABLE I

| Watts | 4Ω | 6Ω | 8Ω | 16Ω |
| --- | --- | --- | --- | --- |
| 25 | 2.225 VDC | 2.425 VDC | 2.625 VDC | 2.825 VDC |
| 50 | 2.250 VDC | 2.450 VDC | 2.650 VDC | 2.850 VDC |
| 75 | 2.275 VDC | 2.475 VDC | 2.675 VDC | 2.875 VDC |
| 100 | 2.300 VDC | 2.500 VDC | 2.700 VDC | 2.900 VDC |

As can be seen in Table I, a 4Ω loudspeaker 216 that is part of PLA 113, and which has a 25 W power rating can be ascertained by determining that $V_{status(D)}$ 308 is about 2.225 VDC.

As discussed above, the determinations based on $V_{status(D)}$ 308 can be used to select a power allocation mode for ADS 100, i.e., how power is to be distributed to each loudspeaker 216 in ALAs 112 and PLAs 114.

The first power allocation mode to be addressed is "power handling." The power handling mode of power allocation can be defined as maximizing the amount of power sent to each loudspeaker based on the loudspeakers determined maximum power rating. In the power handling mode of power allocation, ACS App 128 allocates power to each loudspeaker beginning with the lowest maximum rated power loudspeaker, and then allocating remaining power to those loudspeakers with higher maximum power ratings. Thus, each loudspeaker in an ALA-PLA set is provided with no more than its maximum rated power.

By way of a non-limiting example, suppose there are 25 W available and a total of 3 loudspeakers 216a,b,c. Loudspeakers 216a,b are in PLA 114, and each are capable of handling 5 W each (10 W total for PLA 114), and there is one loudspeaker 216c in ALA 112, capable of handling 25 W. In the power handling mode, 10 W could be sent to PLA 114 to be split between loudspeakers 216a,b, and 15 W can be sent to loudspeaker 216c in ALA 112.

The second power allocation mode to be addressed is "intelligent power allocation/steering." The intelligent power allocation/steering mode of operation can be defined as allocating power substantially equally between all the loudspeakers in an ALA-PLA set (up to each loudspeaker's maximum power rating.

By way of a non-limiting example, suppose there are 25 W available and a total of 3 loudspeakers 216a,b,c. Loudspeaker 216a is in ALA 112, and capable of handling 25 W. Loudspeakers 216b,c are in PLA 114, and each are capable of handling 10 W each (20 W total for PLA 114). All loudspeakers have an impedance of 8Ω. In the intelligent power allocation/steering mode, each loudspeaker 216a,b,c would receive about 8.3 W each (25 W/3=8.3 W).

In the intelligent power allocation/steering mode of operation, according to aspects of the embodiments, the audio stream can be tailored to result in substantially equal power being delivered to different PLAs 114, based on the total number of loudspeakers 216, their impedances, and power ratings. In this manner, ACS App 128 can maximize volume/sound level for any given installation configuration.

By way of a non-limiting example, suppose there are 25 W available and a total of 2 loudspeakers 216a,b. In this case, the speakers have dissimilar impedances. Loudspeaker 216a is in ALA 112 and has an impedance of 8Ω. Loudspeaker 216b is in PLA 114 and has an impedance of 4Ω. The goal of the intelligent power allocation/steering mode is to deliver equal power to the two dissimilar loudspeakers—in this case 12.5 W each (25 W/2=12.5 W). Given that the impedances are dissimilar, the Class-D amplifier will need to drive them with different voltages to achieve equal power output. The equation that defines this relationship is:

$$V_{Class-D(output)} = \sqrt{(P_{loudspeaker} R_{loudspeaker-imp})}$$

As a result, the Class-D amplifiers maximum output voltages would be automatically scaled/constrained to 10V and 7.07V, respectively. In practice, intelligent power allocation/steering can also be achieved by having ACS App 128 and DSP 212 implement a limiter to constrain the maximum volume of any given loudspeaker 216.

The third power allocation mode to be addressed is "direct assignment." Power can also be intentionally distributed substantially evenly or unevenly through a process referred to as "direct assignment." According to aspects of the embodiments, determining that one or more PLAs 114 are properly connected, and then determining loudspeaker impedances and power ratings using the encoding process described above allows ACS App 128 to allocate power unevenly between ALA 112 and n-number of similar or dissimilar PLAs 114 (e.g., three 80 PLAs 114, or two 80 PLAs 114 and one 120 PLAs 114). According to aspects of the embodiments, therefor, the audio stream can be tailored to result in different amounts of power being delivered to different PLAs 114 based on their impedances and power ratings. In this manner, ACS App 128 can maximize the power sent to each loudspeaker 216 in respective PLAs 114 and substantially minimize the possibility of over-driving loudspeakers, thereby preventing damage and extending their lifetime.

In practice, uneven steering can be achieved by having ACS App 128 and DSP 212 implement a limiter to constrain the maximum power of any given speaker. Furthermore, as with intelligent power allocation/steering, not quite all available power can be sent to loudspeakers 216, as ALA 112 comprises processors and converters, which, due to finite efficiency, consume some power themselves. As a result, the actual power delivered to the loudspeakers 216, wherever they are located, will be somewhat less the total input power received.

FIG. 4 is flowchart of method 400 to set up ADS 100 as shown in FIG. 1 according to aspects of the embodiments. Method 400 begins with method step 402 in which ADS 100 is installed in one or more areas of enterprise location 102 of some type of enterprise entity. An enterprise entity can be virtually any type of building—residential, commercial, or government, among other types. In method step 402, one or more ALAs 112 can be installed, along with one or more PLAs 114, interconnected by ethernet cables 106 (method step 404), along with at least ASC 110 (with App 128), and optionally MED 118, PC 120, external audio source 122 and network server 108. Depending on the type of audio to be played, there will be at least one type of audio source, which can include one or more microphones, or external audio source 122, or a source obtained via network system 104, or some type of audio stored on PC 120.

In method step 406, a user opens ACS App 128 to begin the installation verification and system set up process. IP addresses of each of the ALAs 112 and PLAs are either found or entered into App 128, and in method step 408, the user, through ACS App 128, begins the interconnection verification process, as well as the ALA 112 and PLA 114 identification process. In the former, the interconnection verification process, ACS App 128 queries each ALA 112 to determine if one or more properly connected PLAs 114 are connected to it. ACS App 128 sends a request to each ALA 112 to report back whether there are any valid PLA connection status signals 228; the user can then check that against the specification used to install ADS 100 to verify all, some, or none of the expected PLAs 114 have been properly connected. By way of a non-limiting example, if there are ten ALAs 112a-j, and each has two PLAs 114 connected to them, but ALA 112h is reporting only one PLA 114, then the installers know that one ethernet cable 106 has been installed to the wrong device or omitted altogether.

In method step 408, method 400 can also determine, for each ALA 114 that is properly connected, the impedance and maximum power rating for each loudspeaker 216 that comprises PLA 114, as discussed above in regard to Table I.

As described above, ACS 128 can not only determine the impedances of each loudspeaker in each correctly attached PLA 114, but also, through use of the digitized status signal $V_{status(D)}$ 308 (as shown in Table I), the power rating for each loudspeaker 216. The determination of the number of loudspeakers, their respective impedances, and respective power ratings, allows ACS 128 and the user(s) to determine a power mode, which was described above, and below in regard to FIG. 5, and method step 516. Such power operating modes include power handling, intelligent power allocation/steering, and direct assignment.

In method step 410 (which is optional), ACS App 128 generates a map illustrating the location of each ALA 112 and/or PLA 114, which also includes the IP addresses of each ALA 112 and PLA 114, and other notes, as necessary. At this point, set up of ADS 100 can be considered complete. Method 500, discussed below, describes additional steps for testing and setting up an operation mode.

Following successful verification of an installation (i.e., completion of Method 400), ADS 100 is ready to be used as described in regard to Method 500, discussed below.

Figure 5:
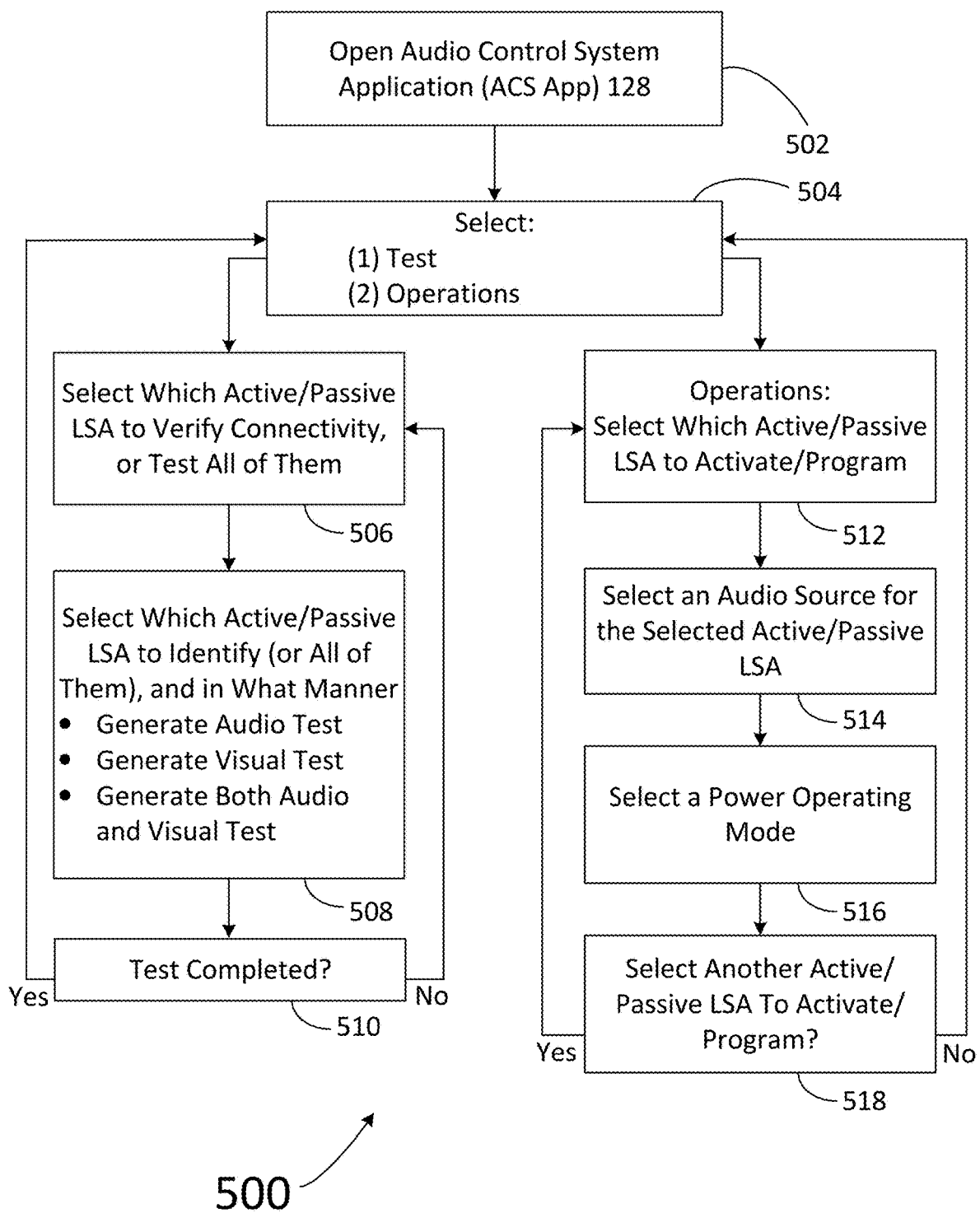
FIG. 5 is a flowchart of a method for using the audio control system shown in FIG. 1 according to aspects of the embodiments.

FIG. 5 is a flowchart of a method 500 for using ADS 100 shown in FIG. 1 according to aspects of the embodiments. Method 500 begins with method step 502 in which one or more users open ACS App 128. In method step 504, the user selects either "Test" or "Operations." Following selection of Test in method decision step 504, method 500 proceeds to method step 506 in which the user is asked to pick which ALA 112 or PLA 114 to test, i.e., to verify the interconnection and identity. Alternatively, the user can select an option to verify interconnections for all of the PLAs 114 connected to ALAs 112.

Then, in method step 508, the user of ACS App 128 can select which ones of the connected ALAs 112 and PLAs 114 to identify, or, alternatively, can require ACS App 128 to identify all of the interconnected ALAs 112 and PLAs 114. As described above, each ALA 112 and PLA 114 can have a unique visual identifier and a unique aural identifier. By way of further example, an aural identifier can include a voice generated by artificial intelligence algorithms that "speaks" the IP address and/or location and/or some other description of the ALA 112 or PLA 114 according to aspects of the embodiments. In decision step 510, method 500 and ACS App 128 determines whether the user is finished with testing. If the user is not finished with testing ("No" path from decision step 510), method 500 returns to method step 506, and if the user is finished with testing ("Yes" path from decision step 510), then method 500 returns to method decision step 504, wherein the user can, if desired, select "Operations."

After the user selects "Operations" in method step 504, ACS App 128, and method 500 proceed to step 512, in which the user selects one or more ALAs 112 and/or PLAs 114 to activate or program. In method step 514, the user selects an audio source for the selected ALA 112 and/or PLA 114; According to aspects of the embodiments, such audio sources can be selected from a list of audio sources that ACS App 128 finds upon loading or opening, or the user can search for and select the audio sources. According to further aspects of the embodiments, ACS App 128 lists one or more different external music sources such as Spotify®, iTunes®, and the like, as well as input ports that might be connected to external audio sources such as a microphone or compact disc player, or radio, and the like.

According to aspects of the embodiments, there can be more than one audio source for one ADS 100, with different audio sources for different ALAs 112 and/or PLAs 114. For example, a microphone can be used for ALAs 112 and/or PLAs 114 that are centered over where people tend to congregate, and for other ALAs 112 and/or PLAs 114 music can be playing even if others are broadcasting voice.

In method step 516, the user selects an operating mode for each ALA 112 and/or PLA 14: intelligent power allocation/steering, power handling, or direct assignment. According to aspects of the embodiments, the selection of the three modes can be the same for each ALA/PLA set, or can be individually assigned through use of ACS App 128. In the latter case, if there were four ALA/PLA sets, each could be assigned a different power operating mode, two could be the same and the other two different, and other combinations.

Following method step 516, method 500 proceeds to decision step 518. In decision step 518, method 500 asks the user whether any other ALAs 112 and/or PLAs 114 need to be programmed. If no more loudspeaker assemblies (LSAs) need to be programmed ("No" path from decision step 518), then method 500 returns to method step 504 and awaits further input. If more LSAs need to be programmed ("Yes" path from decision step 518), then method 500 returns to method step 512.

Figure 6:
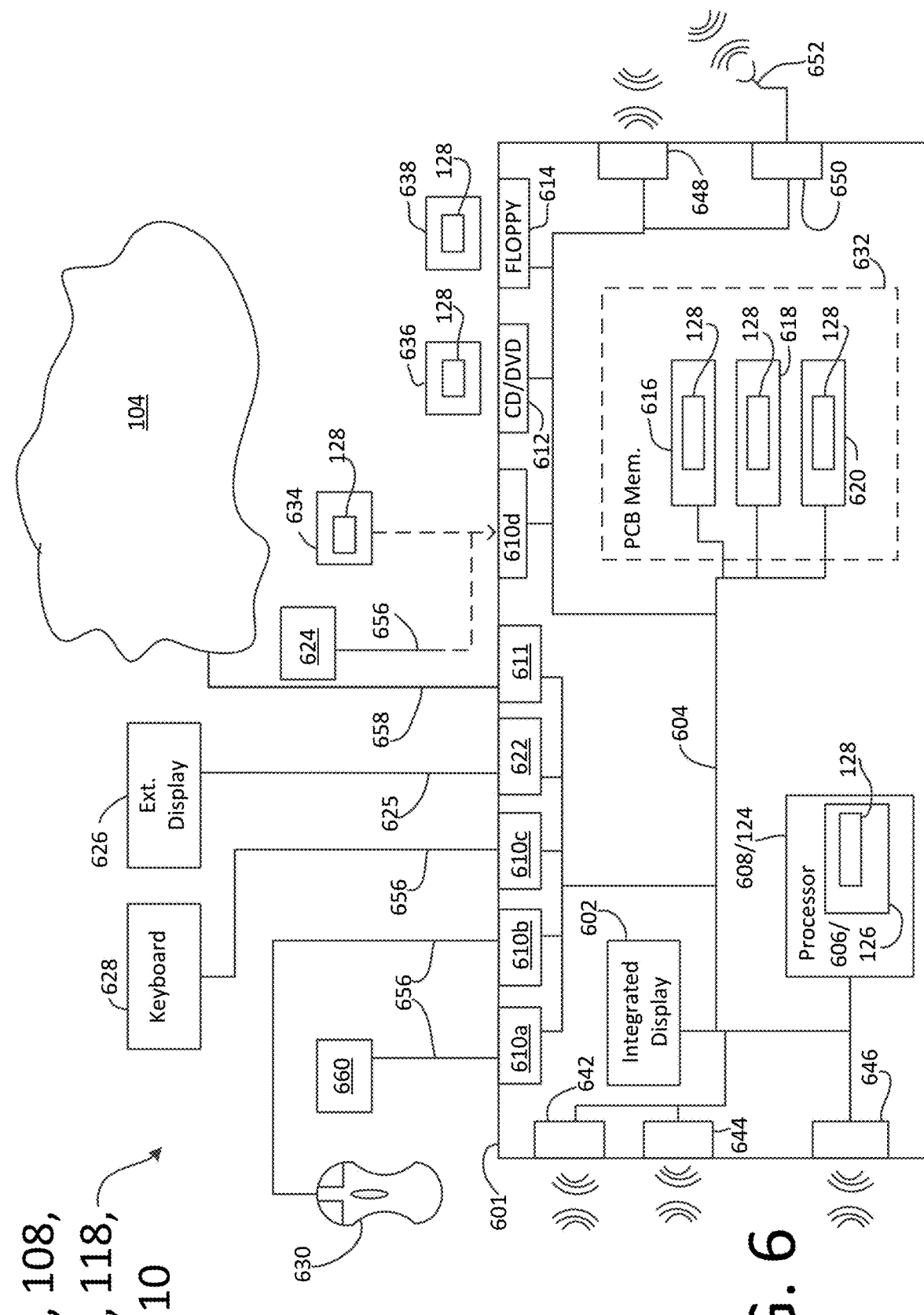
FIG. 6 illustrates a block diagram of an audio system controller and/or active loudspeaker controller (herein after collectively referred to as "controller") suitable to implement the methods of FIGS. 5 and 6, as well as other methods, for setting up and operating the audio distribution system shown in FIG. 1 according to aspects of the embodiments.

FIG. 6 illustrates a block diagram of a computer processing device that can substantially represent the components and functionality of ASC 110, network server 108, PC 120, MED 118 (to some extent, as those of skill in the art can appreciate), and ALA controller 210 (herein after collectively referred to as "controller") 110/210 suitable for use to implement method 500, 600 for setting up and operating ADS 100 as shown in FIG. 1 according to aspects of the embodiments. Controller 110/210 comprises, among other items, shell/box 601, integrated display/touch-screen 602 (though not used in every application of controller 110/210, internal data/command bus (bus) 604, processor board/PC internal memory (internal memory) 632, and one or more processors 608 with processor internal memory 606 (which can be typically read only memory (ROM) and/or random access memory (RAM)). Those of ordinary skill in the art can appreciate that in modern PC systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. Controller 110/210 further comprises multiple input/output ports, such as universal serial bus ports 610, Ethernet ports 611, and video graphics array (VGA) ports/high definition multimedia interface (HDMI) ports 622, among other types. Further, controller 110/210 includes externally accessible drives such as compact disk (CD)/digital video disk (DVD) read/write (RW) (CD/DVD/RW) drive 612, and floppy diskette drive 614 (though less used currently, many PCs still include this device). Controller 110/210 still further includes wireless communication apparatus, such as one or more of the following: Wi-Fi transceiver 642, BlueTooth (BT) transceiver 644, near field communications (NFC) transceiver 646, third generation (3G)/fourth Generation (4G)/long term evolution (LTE)/fifth generation (5G)/sixth generation (6G) (cellular) transceiver 648, communications satellite/global positioning system (satellite) transceiver 650, and antenna 652.

Internal memory 632 itself can comprise hard disk drive (HDD) 616 (these can include conventional magnetic storage media, but, as is becoming increasingly more prevalent, can include flash drive memory 634, among other types), read-only memory (ROM) 618 (these can include electrically erasable (EE) programmable ROM (EEPROMs), ultraviolet erasable PROMs (UVPROMs), among other types), and random access memory (RAM) 620. Usable with USB port 610 is flash drive memory 634, and usable with CD/DVD/RW drive 612 are CD/DVD disks 636 (which can be both read and write-able). Usable with floppy diskette drive 614 are floppy diskettes 638. External memory storage 624 can be used to store data and programs external to box 601 of controller 110/210, and can itself comprise another hard disk drive 616a, flash drive memory 634, among other types of memory storage. External memory storage 624 is connectable to controller 110/210 via USB cable 656. Each of the memory storage devices, or the memory storage media (606, 616, 618, 620, 624, 634, 636, and 638, among others), can contain parts or components, or in its entirety, executable software programming code or application (application, or "App") ACS App 128, which can implement part or all of the portions of methods 500, 600 described herein.

In addition to the above described components, controller 110/210 also comprises keyboard 628, external display 626, printer/scanner/fax machine 660, and mouse 630 (although not technically part of controller 110/210, the peripheral components as shown in FIGS. 6 (622, 624, 626, 628, 630, 634, 636, 638, 656, 658, and 660) are so well known and adapted for use with controller 110/210 that for purposes of this discussion they shall be considered as being part of controller 110/210). Other cable types that can be used with controller 110/210 include RS 232, among others, not shown, that can be used for one or more of the connections between controller 110/210 and the peripheral components described herein. Keyboard 628, mouse 630, and printer/scanner/fax machine 660 are connectable to controller 110/210 via USB cable 56, and external display 626 is connectible to controller 110/210 via VGA cable/HDMI cable 625. controller 110/210 is connectible to internet 654 via Ethernet port 611 and Ethernet cable 658 via a router and modulator-demodulator (MODEM), neither of which are shown in FIG. 6. All of the immediately aforementioned components (622, 624, 626, 628, 630, 634, 636, 638, 656, 658, and 660) are known to those of ordinary skill in the art, and this description includes all known and future variants of these types of devices.

External display 626 can be any type of known display or presentation screen, such as liquid crystal displays (LCDs), light emitting diode displays (LEDs), plasma displays, cathode ray tubes (CRTs), among others. In addition to the user interface mechanism such as mouse 630, controller 110/210 can further include a microphone, touch pad, joystick, touch screen, voice-recognition system, among other inter-active inter-communicative devices/programs, which can be used to enter data and voice, and which all of are known to those of skill in the art and thus a detailed discussion thereof has been omitted in fulfillment of the dual purposes of clarity and brevity.

As mentioned above, controller 110/210 further comprises a plurality of wireless transceiver devices, such as Wi-Fi transceiver 642, BT transceiver 644, NFC transceiver 646, 3G/4G/5G/6G LTE transceiver 648, satellite transceiver device 650, and antenna 652. While each of Wi-Fi transceiver 642, BT transceiver 644, NFC transceiver 646, 3G/4G/5G/6G LTE transceiver 648, and satellite transceiver device 650 has their own specialized functions, each can also be used for other types of communications, such as accessing a cellular service provider (not shown), accessing internet 654, texting, emailing, among other types of communications and data/voice transfers/exchanges, as known to those of skill in the art. Each of Wi-Fi transceiver 642, BT transceiver 644, NFC transceiver 646, 3G/4G/5G/6G LTE transceiver 648, satellite transceiver device 650 includes a transmitting and receiving device, and a specialized antenna, although in some instances, one antenna can be shared by one or more of Wi-Fi transceiver 642, BT transceiver 644, NFC transceiver 646, 3G/4G/5G/6G LTE transceiver 648, and satellite transceiver device 650. Alternatively, one or more of Wi-Fi transceiver 642, BT transceiver 644, NFC transceiver 646, 3G/4G/5G/6G LTE transceiver 648, and satellite transceiver device 650 will have a specialized antenna, such as satellite transceiver device 650 to which is electrically connected at least one antenna 652.

In addition, controller 110/210 can access network system/internet 104, either through a hard wired connection such as Ethernet port N11 as described above, or wirelessly via Wi-Fi transceiver 642, 3G/4G/5G/6G LTE transceiver 648 and/or satellite transceiver 650 (and their respective antennas) according to an embodiment. controller 110/210 can also be part of a larger network configuration as in a global area network (GAN) (e.g., internet 104), which ultimately allows connection to various landlines.

According to further embodiments, integrated touch screen display 602, keyboard 628, mouse 630, and external display 626 (if in the form of a touch screen), can provide a means for a user to enter commands, data, digital, and analog information into controller 110/210. Integrated and external displays 602, 626 can be used to show visual representations of acquired data, and the status of applications that can be running, among other things.

Bus 604 provides a data/command pathway for items such as: the transfer and storage of data/commands between processor 608, Wi-Fi transceiver 642, BT transceiver 644, NFC transceiver 646, 3G/4G/5G/6G LTE transceiver 648, satellite transceiver device 650, integrated display 602, USB port 610, Ethernet port 611, VGA/HDMI port 622, CD/DVD/RW drive 612, floppy diskette drive 614, and internal memory 632. Through bus 604, data can be accessed that is stored in internal memory 632. Processor 608 can send information for visual display to either or both of integrated and external displays 602, 626, and the user can send commands to system operating programs, software, and ACS App 128 that can reside in processor internal memory 606 of processor 608, or any of the other memory devices (636, 638, 616, 618, and 620).

Controller 110/210, and either processor internal memory 606 or internal memory 632, can be used to implement methods 500, 600 for setting up and operating ADS 100 according to aspects of the embodiments. Hardware, firmware, software, or a combination thereof may be used to perform the various steps and operations described herein. According to an embodiment, ACS App 128 for carrying out the above discussed steps can be stored and distributed on multi-media storage devices such as devices 616, 618, 620, 634, 636 and/or 638 (described above) or other form of media capable of portably storing information. Storage media 634, 636 and/or 638 can be inserted into, and read by devices such as USB port 610, CD/DVD/RW drive 612, and disk drives 614, respectively.

As also will be appreciated by one skilled in the art, the various functional aspects of the embodiments may be embodied in a wireless communication device, a telecommunication network, or as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information, and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired, or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

Figure 7:
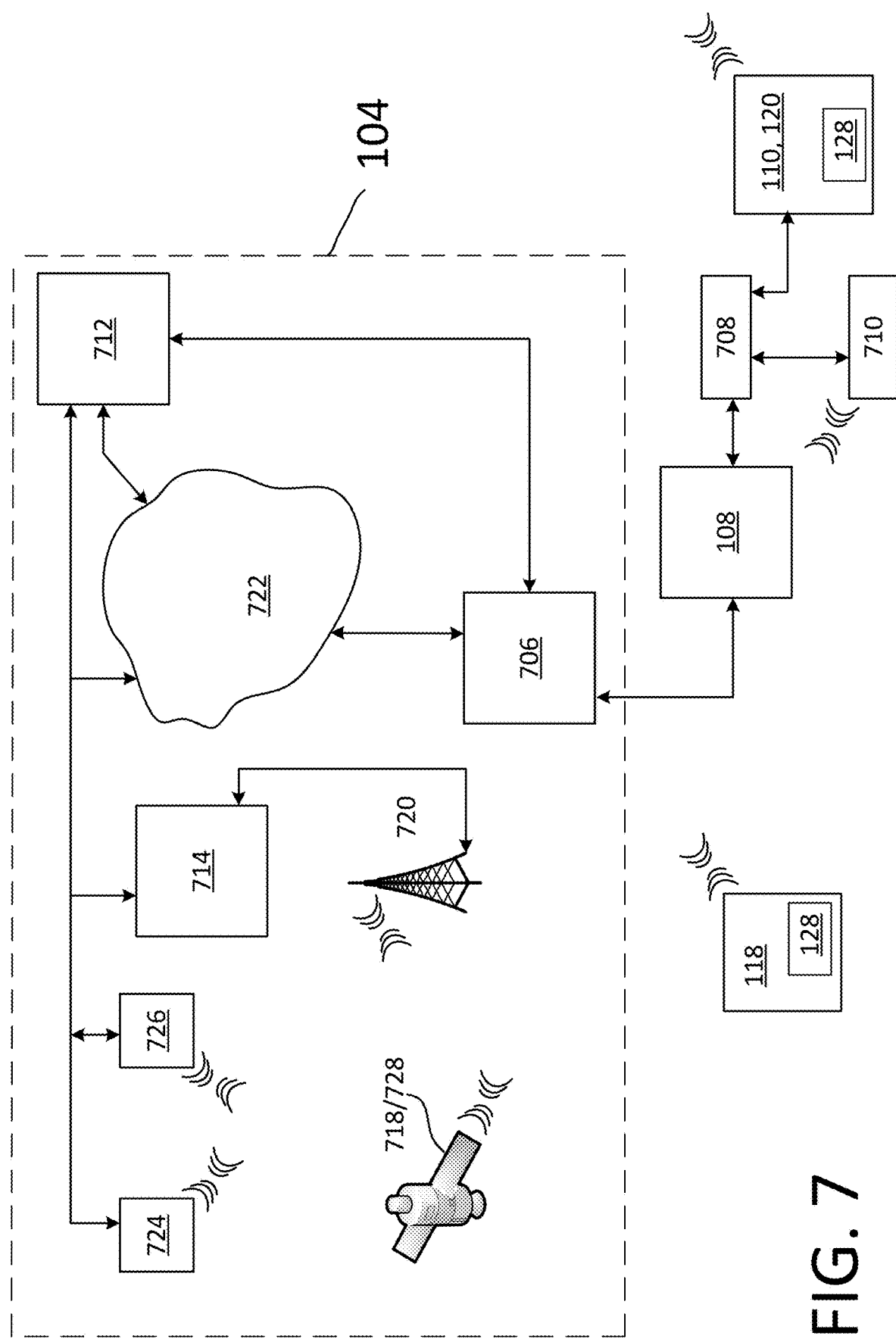
FIG. 7 illustrates a block diagram of a network system within which the system and method for distributing audio using the audio distribution system shown in FIG. 1 can be implemented according to aspects of the embodiments.

FIG. 7 illustrates a block diagram of network system 104 within which ADS 100 methods 500, 600 for setting up and operating ADS 100 as shown in FIG. 1 can be implemented according to aspects of the embodiments.

Much of the infrastructure of network system 104 shown in FIG. 7 is or should be known to those of skill in the art, and therefore, in fulfillment of the dual purposes of clarity and brevity, a detailed discussion thereof shall be omitted.

According to aspects of the embodiments, a user of the above described system and method can store ACS App 128 on their ASC 110 and PC 120, as well as on MED 118. MEDs 118 can include, but are not limited to, so-called smart phones, tablets, personal digital assistants, notebook, and laptop computers, and essentially any device that can access the internet and/or cellular phone service or can facilitate transfer of the same type of data in either a wired or wireless manner.

MED 118, ASC 110, and PC 120 can access cellular service provider 714, either through a wireless connection (cellular tower 720) or via a wireless/wired interconnection (a "Wi-Fi" system that comprises, e.g., modulator/demodulator (modem) 708, wireless router 710, internet service provider (ISP) 706, and internet 1822). Further, MED 118 can include near field communication (NFC), "Wi-Fi," and Bluetooth (BT) communications capabilities as well, all of which are known to those of skill in the art. To that end, network system 104 further includes, as many businesses (and homes) do, one or more PCs 120 (as well as ASC 110) that can be connected to wireless router 710 via a wired connection (e.g., modem 708) or via a wireless connection (e.g., Bluetooth). Modem 708 can be connected to ISP 706 to provide internet-based communications in the appropriate format to end users (e.g., MED 118, ASC 110, PC 120), and which takes signals from the end users and forwards them to ISP 706. Such communication pathways are well known and understand by those of skill in the art, and a further detailed discussion thereof is therefore unnecessary.

MED 118, ASC 110, and PC 120 can also access global positioning system (GPS) satellite 728, which is controlled by GPS station 724, to obtain positioning information (which can be useful for different aspects of the embodiments), or MED 118, ASC 110, and PC 120 can obtain positioning information via cellular service provider 714 using cellular tower(s) 720 according to one or more methods of position determination. Some MED 118, ASC 110, and PC 120 can also access communication satellites 718 and their respective satellite communication systems control stations 726 (the satellite in FIG. 7 is shown common to both communications and GPS functions) for near-universal communications capabilities, albeit at a much higher cost than convention "terrestrial" cellular services. MED 118, ASC 110, and PC 120 can also obtain positioning information when near or internal to a building (or arena/stadium) through the use of one or more of NFC/BT devices. FIG. 7 also illustrates other components of network system 104 such as plain old telephone service (POTS) provider 712.

According to further aspects of the embodiments, and as described above, network system 104 interfaces with network server 108 that can include ACS App 128, wherein one or more processors, using known and understood technology, such as memory, data and instruction buses, and other electronic devices, can store and implement code that can implement the system and method for setting up and operating ADS 100 according to aspects of the embodiments.

Figure 8:
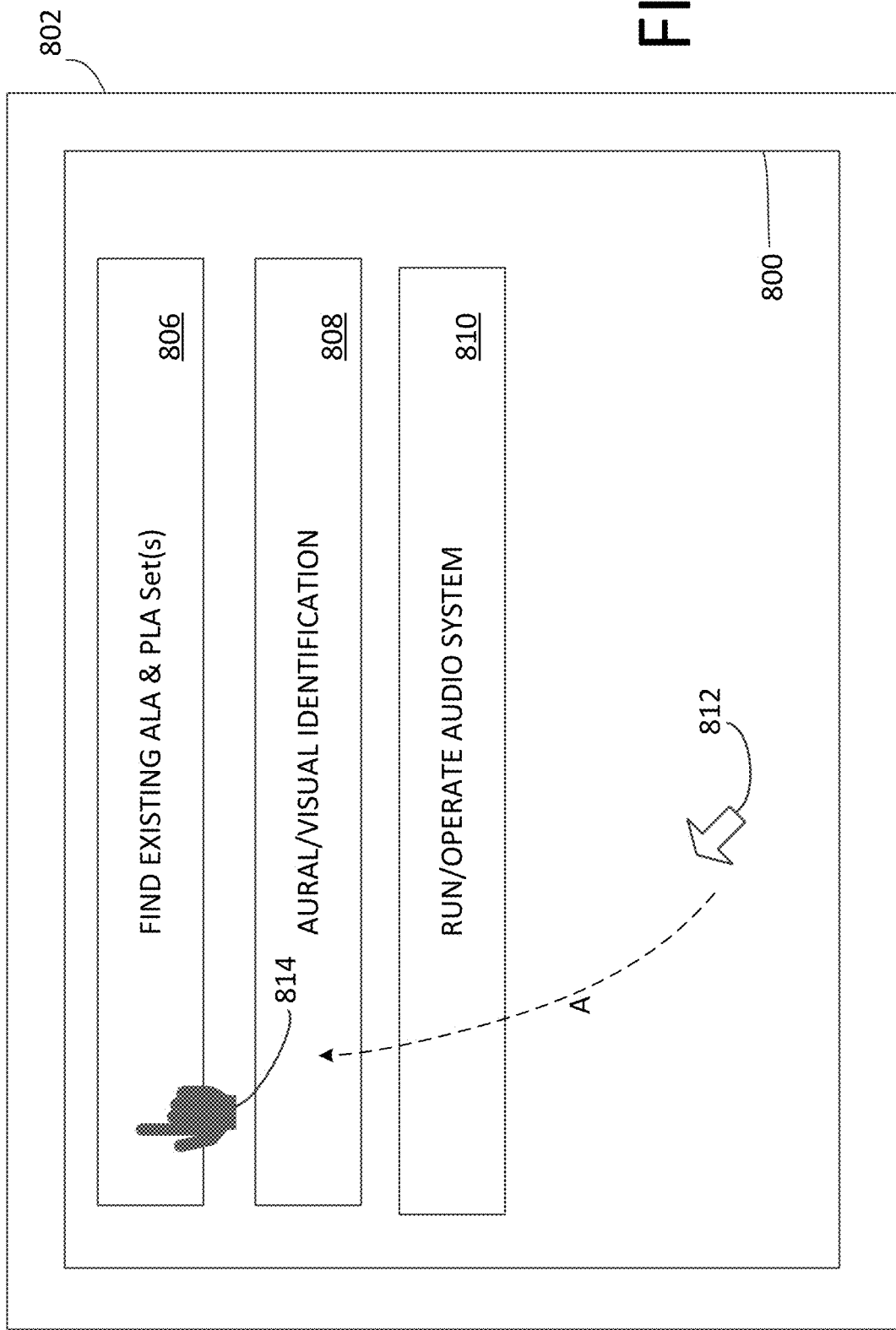
FIG. 8 illustrates a graphical user interface (GUI) with several interactive buttons that call our certain functions that are part of a webpage (as illustrated in several instances of screenshots) that is generated by the Audio Control System (ACS) Application (App) when executed in memory using one or more processors according to aspects of the embodiments.

FIG. 8 illustrates Main Menu window (window) 800 that is a graphical user interface (GUI) with several interactive GUIs (806, 808, 810) that call out certain functions that are shown on monitor screen (screen) 802 when generated by ACS App 128 when executed in memory (e.g., memory 126) using one or more processors (e.g., processor 124) according to aspects of the embodiments.

GUIs are a human-computer interface (i.e., a way for humans to interact with computers) in the form of window, icons, menus, and buttons that can be manipulated by inactive pointer 812 associated with use of mouse 630 (and often to a limited extent by keyboard 628 as well). GUIs stand in sharp contrast to command line interfaces (CLIs), which use only text and are accessed solely by a keyboard. The most familiar example of a CLI to many people is MS-DOS, or some modes of Linux.

As those of skill in the art can windows are contained portions of a screen 802 that can display its contents (e.g., a program, icons, a text file, or an image) seemingly independently of the rest of the screen 802. Icons can also be a GUI. A significant feature of GUIs is the ability for multiple windows to be open simultaneously. Each window can display a different application/program, or each can display different files (e.g., text, image(s), or other types of files/documents) that have been opened or created with a single application.

An icon is a small picture or symbol in a GUI that represents a program (or command), a file, a directory, or a device (such as a hard disk or floppy). Icons can be used both on a desktop and within application programs. Those of skill in the art are familiar with the term "desktop" which represents screen 802 when either no other programs are open, or open programs have been minimized or less than full screen.

Commands are issued in a GUI by using a mouse, trackball, or touchpad to first move inactive pointer 812 on screen 802 to, or on top of, an icon, menu item, or window of interest in order to select that object. Then, for example, icons and windows can be moved by dragging (moving the mouse with the held down) and objects or programs can be opened by clicking on their icons. In addition, GUIs can include fields for entering data, and buttons for saving the entered data.

As those of skill in the art can appreciate, there are several advantages to the use of GUIs. One substantive advantage of the use of GUIs is that they make computer operation more intuitive, and thus easier to learn and use. For example, it is much easier for a new user to move a file from one directory to another by dragging its icon with the mouse than by having to remember and type seemingly arcane commands to accomplish the same task.

Adding to this intuitiveness of operation is the fact that GUIs generally provide users with immediate, visual feedback about the effect of each action. For example, when a user deletes an icon representing a file, the icon immediately disappears, confirming that the file has been deleted (or at least sent to a "trash can"). This contrasts with the situation for a CLI, in which the user types a delete command (inclusive of the name of the file to be deleted) but receives no automatic feedback indicating that the file has actually been removed.

In addition, GUIs allow users to take full advantage of the powerful multitasking (the ability for multiple programs and/or multiple instances of single programs to run simultaneously) capabilities of modern operating systems by allowing such multiple programs and/or instances to be displayed simultaneously. The result is a large increase in the flexibility of computer use and a consequent rise in user productivity.

However, as those of the skill in the art can further appreciate, GUIs have become much more than a mere convenience. GUIs have also become the standard in human-computer interaction, and it has influenced the work of a generation of computer users. Moreover, it has led to the development of new types of applications and entire new industries. An example is desktop publishing, which has revolutionized (and partly wiped out) the traditional printing and typesetting industry.

Despite the great convenience of GUIs however, system administrators and other advanced users tend to prefer the CLI for many operations because it is frequently more convenient and generally more powerful. On Unix-like operating systems for example, GUIs are actually just attractive, convenient coverings for command line programs (i.e., programs which operate from a CLI), and they rely on them for their operation.

One of the great attractions of Unix-like operating systems is that they have maintained their CLI capabilities while continuing to improve their GUIs, thereby allowing advanced users to harness the full power of the computer while simultaneously making it easier for beginning and intermediate users. In contrast, the newer versions of Microsoft Windows have downgraded their CLIs to a marginal role, at best.

FIG. 8 illustrates "Main Menu" window 800 shown in screen 802, wherein "Main Menu" window 800 comprises "Find Existing ALA-PLA Set" (Find) GUI 806, "Aural/Visual Identification" 808, and "Run/Operate Audio System" GUI 810. Inactive pointer 812 is shown as an arrow, and when it is placed over a GUI, it transitions to active pointer 814, showing the user that one or more functions can occur if the user selects of "clicks" on the GUI active pointer 814 is located on. Each of GUIs 806, 808, and 810 will be discussed in turn.

Figure 9:
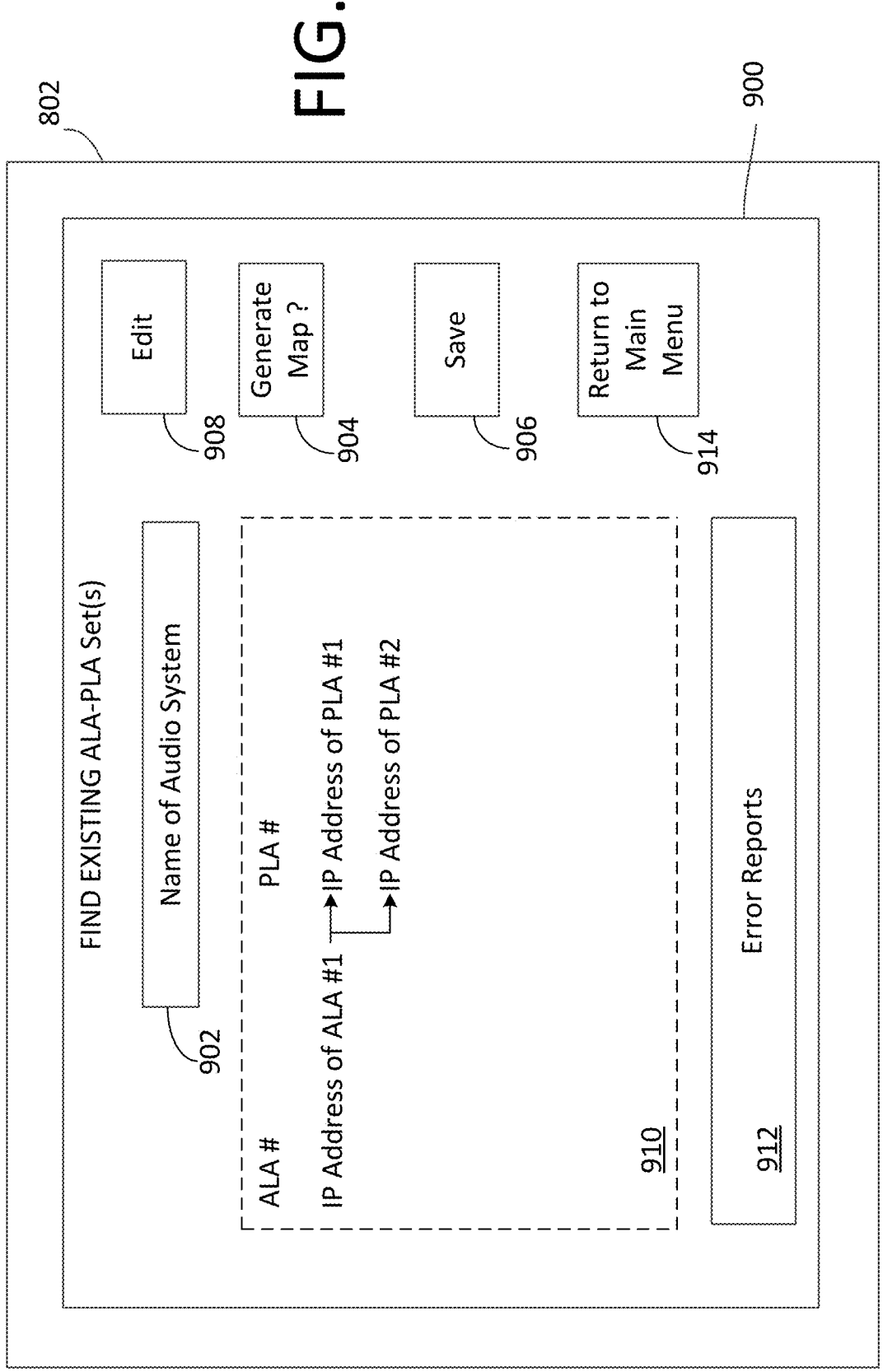
FIG. 9 illustrates a graphical user interface to operate a "Find Existing ALA-PLA Set(s)" function when "Find Existing ALA-PLA Set(s)" GUI 806 as shown in FIG. 8 is clicked by a user, through use of the ACS App according to aspects of the embodiments.

FIG. 9 illustrates a graphical user interface to operate a "Find Existing Active Loudspeaker Assemblies (ALA) & Passive Loudspeaker Assemblies (PLA) Set(s)" function when Find GUI 806 as shown in FIG. 8 is clicked by a user, through use of ACS App 128 according to aspects of the embodiments. Referring now to FIG. 9, when a user selects Find GUI 806 with active pointer 814, "Find" window 900 opens on screen 802 through operation of ADS App 128 according to aspects of the embodiments, and ACS App 128 attempts to find all of the attached ALAs 112 and PLAs 114 (formed as ALA-PLA sets), generating "Display ALA-PLA Name-Addresses" field 910 according to aspects of the embodiments. Thus, a user can find all of the ALAs 112 and PLAs 114 connected to ASC 110. As shown in FIG. 9, a sequential number is assigned to each ALA 112 as it is discovered, and its internet protocol (IP) address is obtained as well. Each PLA 114 that is connected to the respective ALA 112 is also found, in the manner as described above, forming an ALA-PLA set. The IP addresses of the PLAs 114 is also obtained, stored, and displayed, as shown in "Display ALA-PLA Name-Addresses" field 910. The interconnection between an ALA 112 and multiple PLAs is shown graphically in the manner shown in FIG. 9 (or in some other manner as long as it indicates which PLA 114 is assigned to (or belongs to) a respective ALA 112). "Find" window 900 further includes "Generate Map?" button 904, "Save" Button 906, "Edit" button 908, and "Return to Main Menu" button 914.

Clicking on "Save" button 906 in FIG. 9 by a user, with a name in "Name of Audio System" field 902, causes ACS App 128 to save the information acquired by ACS App 128 and shown in "Display ALA-PLA Name-Addresses" field 910. Such information includes the IP addresses and assigned name of the ALA-PLA set. This information is then used for other operations, as described below. The user can then click on "Return to Main Menu" button 914 to return to "Main Menu" window 800 as shown in FIG. 8.

As described above, aspects of the embodiments can verify whether a PLA 114 is properly connected to an ALA 112 or whether some other device that is not a PLA 114 is connected to the respective ALA 112, as well as determining the impedance and maximum power ratings of loudspeakers in a properly connected PLA 114. If there are misconnections of any manner, whether it is an improper device or broken/bad ethernet cable 106, such information is shown in "Error Reports" field 912 according to aspects of the embodiments. According to further aspects of the embodiments, when an ALA 112 is found to be connected to ASC 110, and its IP address obtained, a serial/model number can also be obtained, and configuration information for ALA 112 can be determined by ACS App 128 according to aspects of the embodiments. Such configuration information can include output power, how many ALAs 114 can be connected to the respective PLA, among other types of information.

For example, a first ALA 112 #1 can be connected to ASC 110. Once Find GUI 806 was clicked on, it could be determined that ALA 112 #1 was a 50 dB amplifier with four outputs for connection to four different PLAs. PLAs 114 #1 and #2 could be found to be properly connected, but a third connection was made to a different type of device, and the fourth cable was broken. Thus, "Error Reports" field 912 could show two "problem" or improper connections, and "Display ALA-PLA Names/Addresses" field 910 would show the two properly connected PLAs 114 #1 and #2 connected to the ALA 112. Once all of the ALAs 112 and PLAs 114 (if any) have been identified, the user can click on the "Save" button to save the configuration in memory 126 of ASC 110.

A user can also assign a name to the audio system in "Name of Audio System" field 902 and save it via "Save" button 906. Once saved, the user can change the name if desired through use of "Edit" button 908. Any time one or more ALAs 112 and/or PLAs 114 are swapped out, the Find GUI 806 can be clicked on and find functions run again to update the configuration of the audio system.

Figure 10:
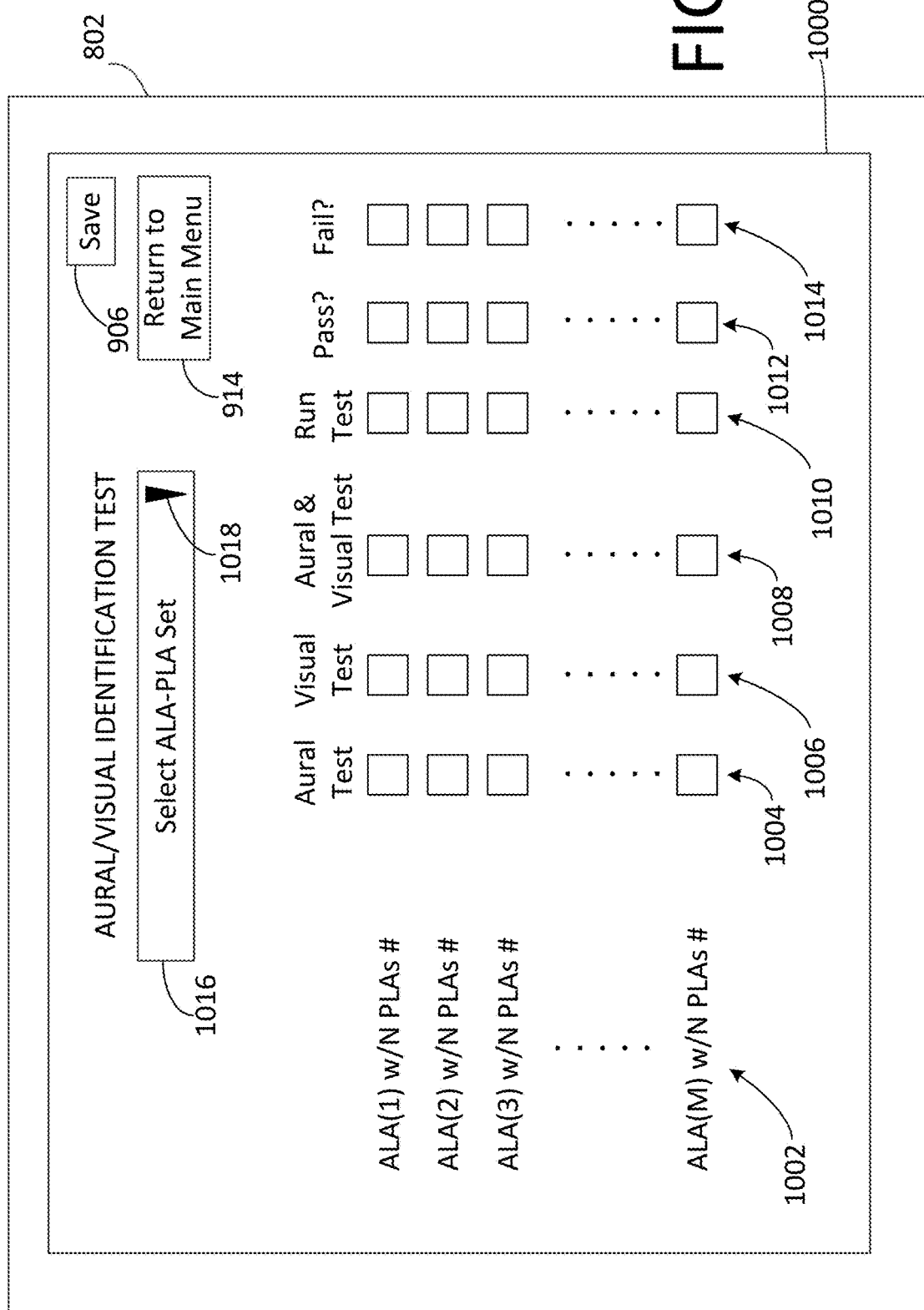
FIG. 10 illustrates a graphical user interface to operate a "Verify Connection Status" function when "Aural/Visual Identification" GUI 808 as shown in FIG. 8 is clicked by a user through use of the ACS App according to aspects of the embodiments.

FIG. 10 illustrates a graphical user interface to operate a "Verify Connection Status" function when Aural/Visual Identification GUI 808 as shown in FIG. 8 is clicked by a user through use of ACS App 128 according to aspects of the embodiments. "Aural/Visual Identification" window 1000 is shown in FIG. 10, that results when Aural/Visual Identification GUI 808 is clicked in window 800. "Aural/Visual Identification" 1000 includes "Select ALA-PLA Set" field 1016, with "ALA-PLA" pulldown button 1018. When ACS App 128 opens "Aural/Visual Identification" 1000 after a user clicks on "Aural/Visual Identification" GUI 808 in window 800, all of the known ALA-PLA sets are listed (shown in "Loudspeaker Assembly" list 1002). There are four columns of buttons, which are labeled: "Aural Test" column of buttons 1004, "Visual Test" column of buttons 1006, "Aural & Visual Test" column of buttons 1008, and "Run Test" column of buttons 1010. The user can click the boxes depending on the type of test they want to run for each ALA-PLA set. For example, if the user wants to run an aural test to identify ALA(1) and its associated PLAs, the user would click the box in column 1004 that corresponds to ALA(1) and then the box in column 1010 to run the test. If the test is successful, the user can then click the corresponding box in column 1012 ("Pass" column of buttons 1012) that records the result as successful, or if not successful, click the box in column 1014 ("Fail" column of buttons 1014).

Following execution of any of the aural and/or visual tests, the user can save the test results by clicking "Save" button 906, and then return to the "Main Menu" window 800 by clicking "Return to Main Menu" button 914.

Figure 11:
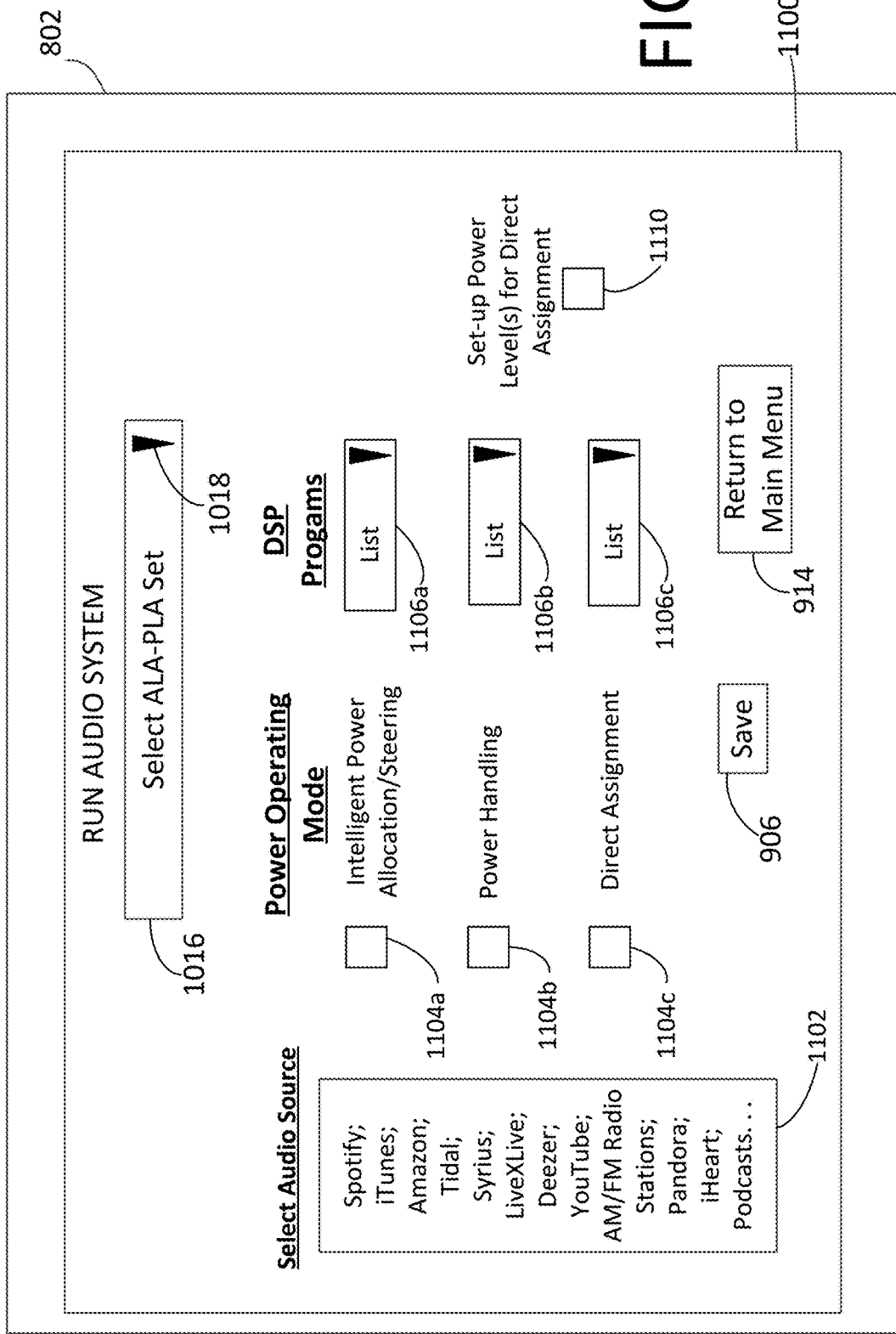
FIG. 11 illustrates a graphical user interface to operate a "Run Audio System" function when "Run/Operate Audio System" GUI 810 as shown in FIG. 8 is clicked by a user through use of the ACS App according to aspects of the embodiments.

FIG. 11 illustrates a graphical user interface to operate a "Run Audio System" function when Run/Operate Audio System GUI 810 as shown in FIG. 8 is clicked by a user through use of ACS App 128 according to aspects of the embodiments. FIG. 11 includes "Run Audio System" window 1100 on screen 802, "Select PLA-ALA Set" field 1016, "List of Known IP Based Audio Providers" field 1102, "Power Operating Mode Selection" column of buttons 1104a-c, Digital Signal Processor (DSP) Programs" list 1106a-c, "Save" button 906, "Set-up Power Level(s) for Direct Assignment" button 1110, and "Return to Main Menu" button 914.

Once at "Run Audio System" window 1100 on screen 802, as shown in FIG. 11, a user first selects a first ALA-PLA set to program and run from a pull-down list in "Name of Audio System" field 902; once a first ALA-PLA set has been selected, the user can then select an audio source in "List of Known IP Based Audio Providers" field 1102. Following selection of the audio source, the user then determines what power operating mode the ALA-PLA set is to operate within through user of "Power Operating Mode Selection" buttons 1104a,b,c.

If the user selects "Intelligent Power Allocation/Steering" button 1104a, the selected ALA-PLA set will operate under an intelligent power allocation/steering mode of operation (once the operating mode is saved). The user can (optionally) select a DSP program from a pull-down list in "DSP Programs" field 1106 to use to process the audio from the selected audio source, or a default DSP program can be used, or the last DSP program selected can be used to process the selected audio.

If the user clicks on "Power Handling" button 1104b, the selected ALA-PLA set will operate under a power handling mode of operation. If the user clicks on "Direct Assignment" button 1104c, the selected ALA-PLA set will operate under a direct assignment of power mode of operation.

Following selection of the DSP program, the user can then save the settings for the selected ALA-PLA by clicking on "Save" button 906. Following selection and set-up of any of the ALA-PLA sets, the user can return to the "Main Menu" window 800 by clicking "Return to Main Menu" button 914.

According to aspects of the embodiments, each of the power operating modes has their own pull down list of DSP programs, as there may be constraints in DSP operations that are dependent on the power operating paradigms, though that need not necessarily be the case.

Figure 12:
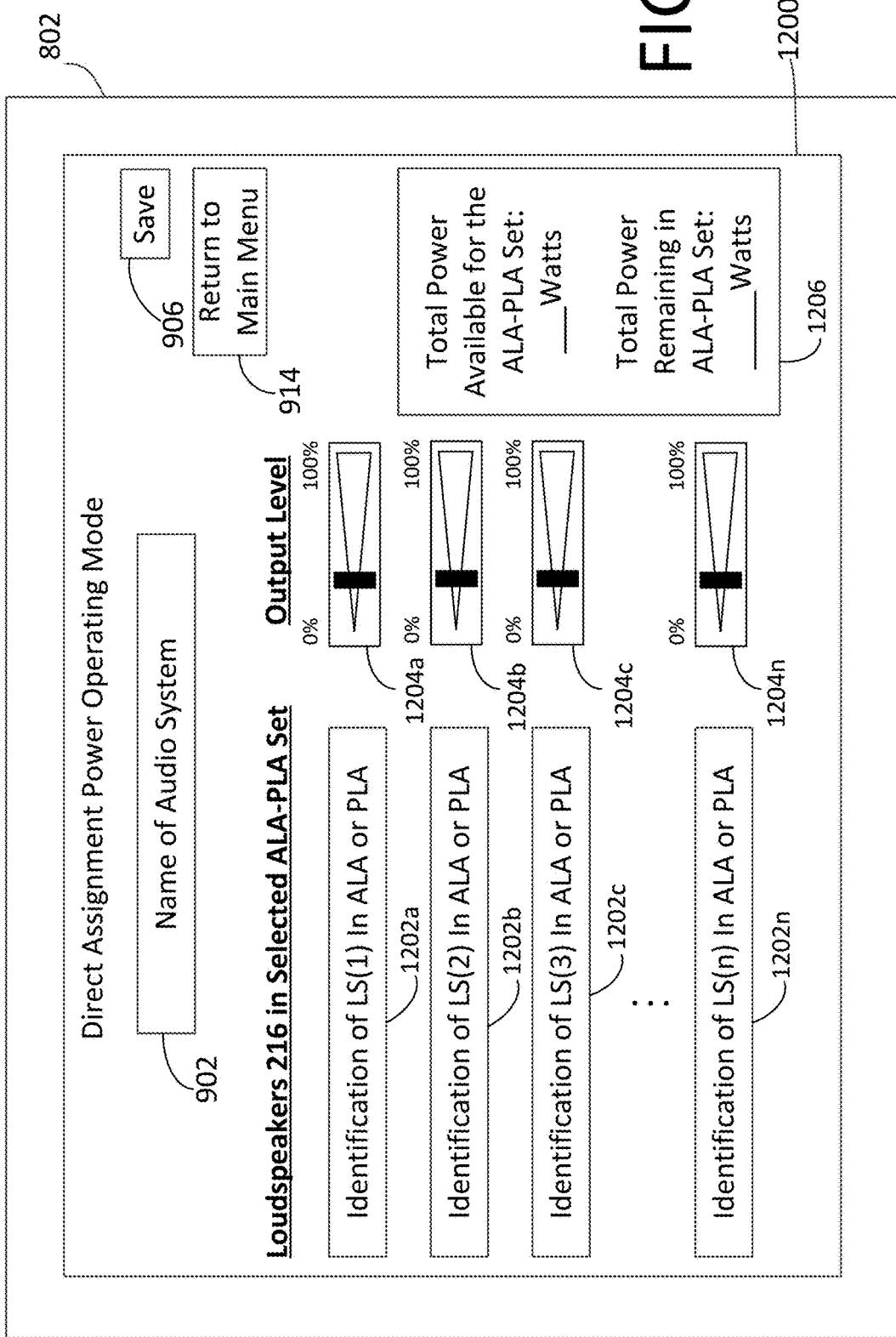
FIG. 12 illustrates a graphical user interface to program an active loudspeaker assembly-passive loudspeaker assembly set using a direct assignment power operating mode through use of ACS App according to aspects of the embodiments.

If the user selects "Power Operating Mode Selection" button 1104c, the "Direct Assignment" mode of operation, the settings will not be saved until the user clicks on "Set Up Power Level" button 1110, which takes the user to "Direct Assignment Power Operating Mode Setup" window 1200, as shown in FIG. 12.

FIG. 12 illustrates a GUI to program an ALA-PLA set using a direct assignment power operating mode through use of ACS App according to aspects of the embodiments. "Direct Assignment Power Operating Mode Setup" window 1200 is shown in FIG. 12. "Loudspeaker Located in Selected ALA-PLA" field 1202 lists all of the loudspeakers 216 located in each of the ALAs 112 and PLAs 114 that comprise the selected ALA-PLA set. For each loudspeaker 216, there is an "Output Level" slide bar 1204, in which the user can change the power assigned to the respective loudspeaker 216; according to aspects of the embodiments, ACS App 128 has acquired the total power available for each ALA-PLA Set, and also the maximum power allowed for the respective loudspeaker 216, so that no more than the maximum allowed power can be sent to the respective loudspeaker 216. Further, should any power setting for any respective loudspeaker 216 cause the maximum allotted power for the ALA-PLA set be exceeded, ACS App 128 will limit the maximum power to be allotted to the respective loudspeaker 216. To assist the user in keeping track of the maximum available power allotted for each ALA-PLA set, "Total Power Remaining in ALA-PLA Set" window 1206 displays the total power available and the power remaining to be allotted.

Thus, by way of a non-limiting example, if there were 25 W available and 4 loudspeakers—each rated at 8 W maximum power each, and no loudspeakers had yet to be set up, then 25 W would be shown to be available. Further if the user allotted the maximum to each loudspeaker in turn, "Total Power Remaining in ALA-PLA Set" window 1206 would show 25 W available, then 17 W available, then 9 W available, then 1 W available. The last loudspeaker would only be able to get 1 W.

Figure 13:
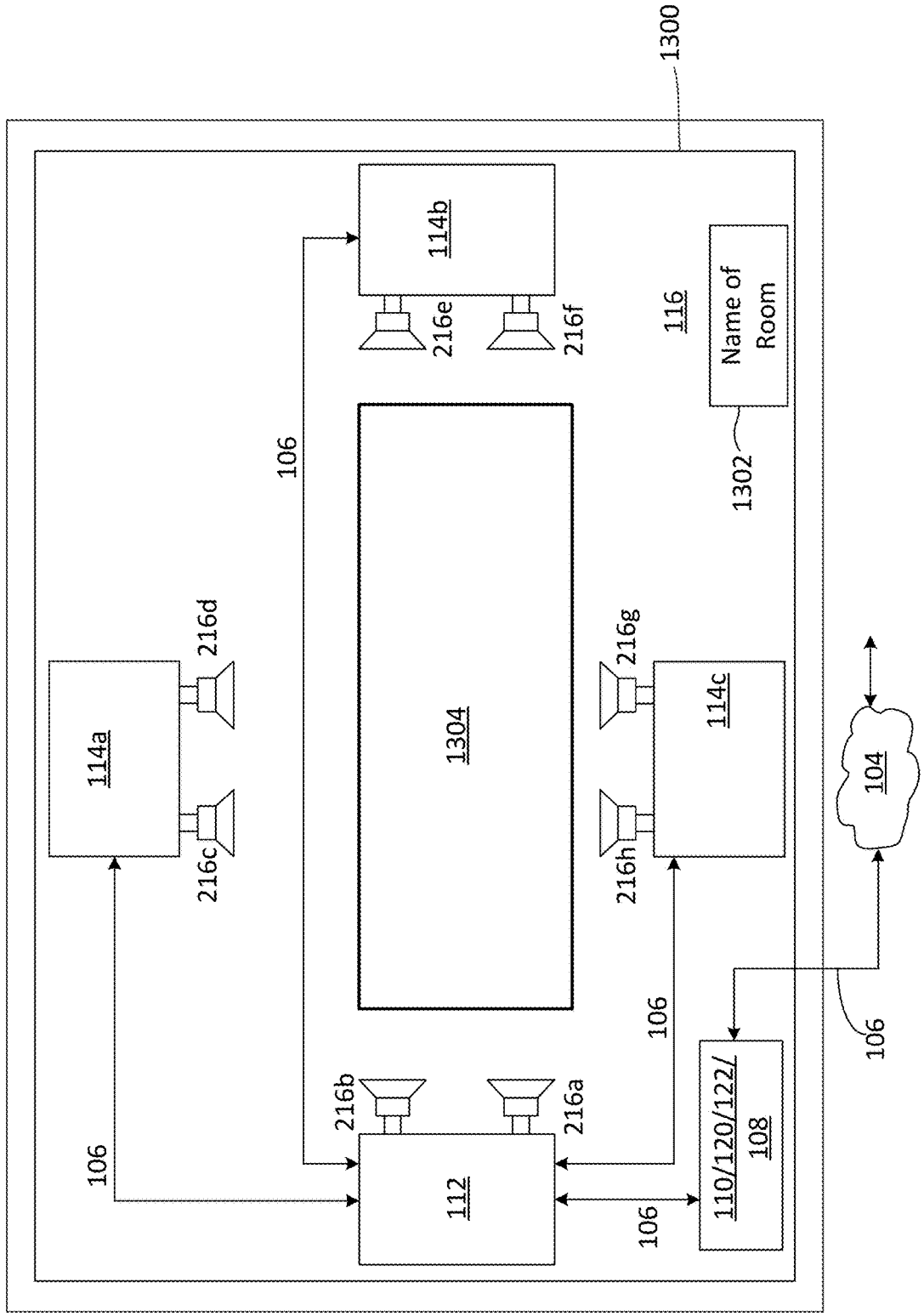
FIG. 13 illustrates a graphical user interface generated by the ACS App when the "Map Generate" interactive button shown in FIG. 9 is activated by a user according to aspects of the embodiments.

FIG. 13 illustrates a graphical user interface generated by the ACS App when the "Generate Map?" interactive button 904 shown in FIG. 9 is activated by a user according to aspects of the embodiments.

If the user clicks on the "Generate Map? button 904 in "Find" window 900, as shown in FIG. 9, ACS App 128 accesses one or more databases with information pertaining to the enterprise location and selected ALA-PLA set, generates a map view of the room(s) wherein the selected ALA-PLA set is located, and opens "Selected ALA-PLA Map View" window 1300 to display the map (an example of which is shown in FIG. 13) according to aspects of the embodiments. The map view also shows "Name of Room" field 1302 to display an assigned name, if one is available, as well as large furniture such as table 1304.

The disclosed embodiments provide a system and method for setting up and operating ADS 100. It should be understood that this description is not intended to limit the embodiments. On the contrary, the embodiments are intended to cover alternatives, modifications, and equivalents, which are included in the spirit and scope of the appended claims. Further, in the detailed description of the embodiments, numerous specific details are set forth to provide a comprehensive understanding of the claimed embodiments. However, one skilled in the art would understand that various embodiments may be practiced without such specific details.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The disclosed embodiments provide systems, methods, and modes for generating a visual indicator to identify a location of a ceiling mounted loudspeaker in an audio distribution system. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

INDUSTRIAL APPLICABILITY

To solve the aforementioned problems, the aspects of the embodiments are directed towards systems, methods, and modes for generating a visual indicator to identify a location of a ceiling mounted loudspeaker in an audio distribution system.

ALTERNATE EMBODIMENTS

Alternate embodiments may be devised without departing from the spirit or the scope of the different aspects of the embodiments.

What is claimed is:

1. A system for generating a visual indicator in a loudspeaker to identify a location of the loudspeaker in a room, comprising:
at least two loudspeaker assemblies, each of which are adapted to receive digitally encoded audio signals and other digital signals, each of the at least two loudspeaker assemblies having a unique digital address and each comprising at least one loudspeaker;
at least one processor communicatively coupled to each of the at least two loudspeaker assemblies;

an input device communicatively coupled to the at least one processor; and a memory operatively connected with the at least one processor, wherein the memory stores computer-executable instructions that, when executed by the at least one processor, cause the at least one processor to execute a method that comprises:

receiving an input from the input device at the at least one processor, the input indicating which one of the at least two loudspeaker assemblies to identify a location thereof;

generating a message to be transmitted to the indicated loudspeaker assembly, wherein the message contains commands and data to generate both a visual indicator in the indicated loudspeaker assembly and an audio indicator from the indicated loudspeaker assembly;

transmitting the message to the indicated loudspeaker assembly; and generating the visual indicator first according to the message at the indicated loudspeaker assembly and then playing the audio indicator according to the message at the indicated loudspeaker assembly, wherein the at least two loudspeaker assemblies comprises:
a first and second loudspeaker assembly communicatively coupled in series to the at least one processor, and further wherein the first loudspeaker assembly is an active loudspeaker assembly and comprises at least one amplifier for amplifying audio signals prior to broadcast by the at least one loudspeaker, and wherein the second loudspeaker assembly is a passive loudspeaker assembly that receives amplified audio from the active loudspeaker assembly.

2. The system according to claim 1, wherein the at least two loudspeaker assemblies comprises:
a first and second loudspeaker assembly communicatively coupled in parallel to the at least one processor.

3. The system according to claim 2, wherein the first and second loudspeaker assemblies are active loudspeaker assemblies, each of which contain at least one amplifier.

4. The system according to claim 1, wherein each of the at least one loudspeakers in the first and second loudspeaker assemblies are balanced mode radiator loudspeakers.

5. The system according to claim 1, wherein the method further comprises:
generating a message to be transmitted to the indicated loudspeaker assembly, wherein the message contains commands and data to generate an audio indicator in the indicated loudspeaker assembly;
transmitting the message to the indicated loudspeaker assembly; and
playing the audio indicator according to the message at the indicated loudspeaker assembly.

6. A method for generating a visual indicator in a loudspeaker to identify a location of the loudspeaker in a room, wherein the room contains at least two loudspeaker assemblies, the method comprising:
receiving an input from an input device at at least one processor,
the at least one processor communicatively coupled to each of the at least two loudspeaker assemblies, and
a memory operatively connected with the at least one processor, wherein the memory stores computer-executable instructions that, when executed by the at least one processor, cause the at least one processor to execute the method, and wherein
the input indicates which one of at least two loudspeaker assemblies to identify a location thereof;
generating a message to be transmitted to the indicated loudspeaker assembly, wherein the message contains commands and data to generate both a visual indicator in the indicated loudspeaker assembly and an audio indicator from the indicated loudspeaker assembly;
transmitting the message to the indicated loudspeaker assembly; and
generating the visual indicator first according to the message at the indicated loudspeaker assembly and then playing the audio indicator according to the message at the indicated loudspeaker assembly, wherein the at least two loudspeaker assemblies comprise:
a first and second loudspeaker assembly communicatively coupled in series to the at least one processor, and further wherein
the first loudspeaker assembly is an active loudspeaker assembly and comprises at least one amplifier for amplifying audio signals prior to broadcast by the at least one loudspeaker, and wherein
the second loudspeaker assembly is a passive loudspeaker assembly that receives amplified audio from the active loudspeaker assembly.

7. The method according to claim 6, wherein the at least two loudspeaker assemblies comprises:
a first and second loudspeaker assembly are communicatively coupled in parallel to the at least one processor.

8. The method according to claim 7, wherein
the first and second loudspeaker assemblies are active loudspeaker assemblies, each of which contain at least one amplifier.

9. The method according to claim 6, wherein each of the at least one loudspeakers in the first and second loudspeaker assemblies are balanced mode radiator loudspeakers.

10. The method according to claim 6, further comprising:
generating a message to be transmitted to the indicated loudspeaker assembly, wherein the message contains commands and data to generate an audio indicator in the indicated loudspeaker assembly;
transmitting the message to the indicated loudspeaker assembly; and
playing the audio indicator according to the message at the indicated loudspeaker assembly.

11. An audio distribution system (ADS), comprising:
at least two loudspeaker assemblies, each of which are adapted to receive digitally encoded audio signals and other digital signals, each of the at least two loudspeaker assemblies having a unique digital address and each comprising at least one loudspeaker; and
an audio distribution system (ADS) controller, the ADS controller comprising:
at least one processor communicatively coupled to each of the at least two loudspeaker assemblies;
an input device communicatively coupled to the at least one processor; and
a memory operatively connected with the at least one processor, wherein the memory stores computer-executable instructions that, when executed by the at least one processor, cause the at least one processor to execute a method that comprises:
receiving an input from the input device at the at least one processor, the input indicating which one of the at least two loudspeaker assemblies to identify a location thereof;
generating a message to be transmitted to the indicated loudspeaker assembly, wherein the message contains commands and data to generate both a visual indicator in the indicated loudspeaker assembly and an audio indicator from the indicated loudspeaker assembly;
transmitting the message to the indicated loudspeaker assembly; and
generating the visual indicator first according to the message at the indicated loudspeaker assembly and then playing the audio indicator according to the message at the indicated loudspeaker assembly, wherein the at least two loudspeaker assemblies comprises:
 a first and second loudspeaker assembly communicatively coupled in series to the at least one processor, and further wherein
  the first loudspeaker assembly is an active loudspeaker assembly and comprises at least one amplifier for amplifying audio signals prior to broadcast by the at least one loudspeaker, and wherein
  the second loudspeaker assembly is a passive loudspeaker assembly that receives amplified audio from the active loudspeaker assembly.

12. The system according to claim 11, further comprising:
an external audio source, communicatively coupled to the ADS controller, the external audio source adapted to transmit audio signals to the ADS controller to be broadcast through at least one of the at least two loudspeaker assemblies; and
a network server communicatively coupled to the ADS controller and a network, the network server adapted to receive messages through the network, the messages comprising audio information to be broadcast through at least one of the at least two loudspeaker assemblies.

13. The system according to claim 11, wherein the at least two loudspeaker assemblies comprises:
a first and second loudspeaker assembly are communicatively coupled in parallel to the at least one processor.

14. The system according to claim 13, wherein the first and second loudspeaker assemblies are active loudspeaker assemblies, each of which contain at least one amplifier.

15. The system according to claim 11, wherein each of the at least one loudspeakers in the first and second loudspeaker assemblies are balanced mode radiator loudspeakers.

16. The system according to claim 11, wherein the method further comprises:
generating a message to be transmitted to the indicated loudspeaker assembly, wherein the message contains commands and data to generate an audio indicator in the indicated loudspeaker assembly;
transmitting the message to the indicated loudspeaker assembly; and
playing the audio indicator according to the message at the indicated loudspeaker assembly.

\* \* \* \* \*